(12) United States Patent
Shoji et al.

(10) Patent No.: US 7,554,574 B2
(45) Date of Patent: Jun. 30, 2009

(54) ABNORMAL STATE OCCURRENCE PREDICTING METHOD, STATE DECIDING APPARATUS, AND IMAGE FORMING SYSTEM

(75) Inventors: Hisashi Shoji, Tokyo (JP); Katsuaki Miyawaki, Tokyo (JP); Osamu Satoh, Tokyo (JP); Masaaki Yamada, Tokyo (JP); Shuji Hirai, Tokyo (JP); Yoshinori Nakagawa, Tokyo (JP); Eiichi Ohta, Tokyo (JP); Takashi Seto, Tokyo (JP); Satoshi Ouchi, Tokyo (JP); Nekka Matsuura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 860 days.

(21) Appl. No.: 10/875,277

(22) Filed: Jun. 25, 2004

(65) Prior Publication Data
US 2005/0002054 A1    Jan. 6, 2005

(30) Foreign Application Priority Data
Jun. 27, 2003    (JP)    ............................... 2003-184929

(51) Int. Cl.
H04N 5/232    (2006.01)
(52) U.S. Cl. ...................................... 348/207.99; 399/9
(58) Field of Classification Search ................ 358/1.14; 399/9; 348/207.99
See application file for complete search history.

(56) References Cited

U.S. PATENT DOCUMENTS

| | | | |
|---|---|---|---|
| 4,510,491 A * | 4/1985 | Prato ............................ 345/56 |
| 5,008,732 A | 4/1991 | Kondo et al. | |
| 5,025,481 A | 6/1991 | Ohuchi | |
| 5,051,760 A | 9/1991 | Shoji et al. | |
| 5,060,012 A | 10/1991 | Seto et al. | |
| 5,101,288 A | 3/1992 | Ohta et al. | |
| 5,117,299 A | 5/1992 | Kondo et al. | |
| 5,132,676 A | 7/1992 | Kimura et al. | |
| 5,134,429 A | 7/1992 | Ishikawa et al. | |
| 5,134,666 A | 7/1992 | Imao et al. | |
| 5,142,390 A | 8/1992 | Ohta et al. | |
| 5,148,495 A | 9/1992 | Imao et al. | |
| 5,153,753 A | 10/1992 | Ohta et al. | |
| 5,214,416 A | 5/1993 | Kondo et al. | |
| 5,220,355 A | 6/1993 | Miyawaki | |
| 5,237,308 A * | 8/1993 | Nakamura .................. 340/588 |
| 5,263,698 A | 11/1993 | Higuchi et al. | |

(Continued)

FOREIGN PATENT DOCUMENTS

JP    2001-175328    6/2001

OTHER PUBLICATIONS

U.S. Appl. No. 07/631,084, filed Dec. 19, 1990.

(Continued)

*Primary Examiner*—Tuan V Ho
*Assistant Examiner*—Kent Wang
(74) *Attorney, Agent, or Firm*—Oblon, Spivak, McClelland, Maier & Neustadt, P.C.

(57) ABSTRACT

In a state deciding apparatus, an information acquiring unit acquires pieces of information of different types related to a state of an image forming apparatus. An index value calculating unit calculates an index value based on the pieces of information acquired. A state change deciding unit decides a change in a subsequent state of the image forming apparatus, based on a temporal change in the index value calculated.

25 Claims, 12 Drawing Sheets

U.S. PATENT DOCUMENTS

| | | | |
|---|---|---|---|
| 5,300,952 A | 4/1994 | Wada et al. | |
| 5,309,177 A | 5/1994 | Shoji et al. | |
| 5,311,332 A | 5/1994 | Imao et al. | |
| 5,319,479 A | 6/1994 | Yamada et al. | |
| 5,337,075 A | 8/1994 | Takahashi et al. | |
| 5,371,522 A | 12/1994 | Miyawaki et al. | |
| 5,379,058 A | 1/1995 | Obu et al. | |
| 5,418,899 A | 5/1995 | Aoki et al. | |
| 5,436,739 A | 7/1995 | Imao et al. | |
| 5,508,520 A | 4/1996 | Shoji et al. | |
| 5,521,679 A | 5/1996 | Miyakawa et al. | |
| 5,541,742 A | 7/1996 | Imao et al. | |
| 5,543,945 A | 8/1996 | Kimura et al. | |
| 5,606,408 A | 2/1997 | Yano et al. | |
| 5,612,278 A | 3/1997 | Masubuchi et al. | |
| 5,617,485 A | 4/1997 | Ohuchi et al. | |
| 5,619,316 A | 4/1997 | Shoji et al. | |
| 5,659,406 A | 8/1997 | Imao et al. | |
| 5,708,938 A | 1/1998 | Takeuchi et al. | |
| 5,740,494 A | 4/1998 | Shoji et al. | |
| 5,812,745 A * | 9/1998 | Kim et al. | 358/1.14 |
| 5,825,937 A | 10/1998 | Ohuchi et al. | |
| 5,848,329 A | 12/1998 | Aoyama et al. | |
| 5,850,298 A | 12/1998 | Narahara et al. | |
| 5,911,004 A | 6/1999 | Ohuchi et al. | |
| 5,915,155 A | 6/1999 | Shoji et al. | |
| 5,937,228 A | 8/1999 | Shoji et al. | |
| 5,968,301 A | 10/1999 | Murakami et al. | |
| 5,970,280 A | 10/1999 | Suzuki et al. | |
| 5,999,762 A | 12/1999 | Shoji | |
| 6,052,205 A | 4/2000 | Matsuura | |
| 6,108,508 A | 8/2000 | Takeuchi et al. | |
| 6,121,619 A * | 9/2000 | Johnsen et al. | 250/369 |
| 6,125,243 A | 9/2000 | Shoji et al. | |
| 6,160,979 A | 12/2000 | Shoji | |
| 6,259,813 B1 | 7/2001 | Ouchi | |
| 6,324,374 B1 | 11/2001 | Sasamoto et al. | |
| 6,341,847 B1 | 1/2002 | Ohta et al. | |
| 6,345,170 B1 | 2/2002 | Nakazato et al. | |
| 6,351,315 B2 * | 2/2002 | Kusumoto | 358/1.14 |
| 6,354,697 B1 | 3/2002 | Tanaka et al. | |
| 6,367,914 B1 | 4/2002 | Ohtaka et al. | |
| 6,456,806 B2 | 9/2002 | Shoji et al. | |
| 6,459,816 B2 | 10/2002 | Matsuura et al. | |
| 6,480,623 B1 | 11/2002 | Yagishita et al. | |
| RE37,940 E | 12/2002 | Imao et al. | |
| 6,505,014 B2 | 1/2003 | Aoki et al. | |
| 6,507,674 B1 | 1/2003 | Yagishita et al. | |
| 6,515,747 B1 | 2/2003 | Satoh et al. | |
| 6,519,052 B1 | 2/2003 | Oneda et al. | |
| 6,529,286 B1 * | 3/2003 | King | 358/1.14 |
| 6,556,707 B1 | 4/2003 | Yagishita et al. | |
| 6,556,802 B2 | 4/2003 | Sasamoto et al. | |
| 6,571,071 B2 | 5/2003 | Kanoshima et al. | |
| 6,597,885 B2 | 7/2003 | Kai et al. | |
| 6,603,884 B2 | 8/2003 | Matsuura et al. | |
| 6,669,189 B2 | 12/2003 | Seto et al. | |
| 6,671,484 B2 | 12/2003 | Miyoshi et al. | |
| 6,674,982 B2 | 1/2004 | Saitoh et al. | |
| 6,681,096 B2 | 1/2004 | Seto et al. | |
| 6,683,990 B2 | 1/2004 | Yagishita et al. | |
| 6,694,112 B2 | 2/2004 | Sasaki et al. | |
| 6,704,444 B2 | 3/2004 | Yagishita et al. | |
| 6,704,455 B1 | 3/2004 | Yamazaki et al. | |
| 6,707,480 B2 | 3/2004 | Ameyama et al. | |
| 6,714,685 B2 | 3/2004 | Matsuura et al. | |
| 6,721,516 B2 | 4/2004 | Aoki et al. | |
| 6,725,003 B2 | 4/2004 | Shinkai et al. | |
| 6,728,001 B1 * | 4/2004 | Lee | 358/1.15 |
| 6,741,831 B2 | 5/2004 | Seto | |
| 6,757,509 B2 | 6/2004 | Shoji et al. | |
| 6,757,512 B2 | 6/2004 | Miyawaki et al. | |
| 6,768,891 B2 | 7/2004 | Sasamoto et al. | |
| 6,778,805 B2 | 8/2004 | Kai et al. | |
| 6,785,490 B2 | 8/2004 | Tsukamoto et al. | |
| 6,788,811 B1 | 9/2004 | Matsuura et al. | |
| 6,937,271 B1 * | 8/2005 | Mori et al. | 348/207.99 |
| 7,009,722 B1 * | 3/2006 | Nishigaki | 358/1.15 |
| 7,352,480 B2 * | 4/2008 | Abe | 358/1.13 |
| 2001/0046062 A1 * | 11/2001 | Miyazaki | 358/1.14 |
| 2002/0067494 A1 * | 6/2002 | Furuya | 358/1.9 |
| 2002/0171874 A1 | 11/2002 | Hirano et al. | |
| 2003/0058465 A1 | 3/2003 | Miyagi et al. | |
| 2003/0095287 A1 | 5/2003 | Miyagi et al. | |
| 2003/0151764 A1 * | 8/2003 | Uchida | 358/1.14 |
| 2003/0231332 A1 * | 12/2003 | Barrett | 358/1.14 |
| 2004/0001222 A1 * | 1/2004 | Ogura | 358/1.15 |
| 2004/0252324 A1 * | 12/2004 | Ohta | 358/1.14 |
| 2005/0002054 A1 | 1/2005 | Shoji et al. | |

OTHER PUBLICATIONS

U.S. Appl. No. 07/828,474, filed Jan. 30, 1992.
U.S. Appl. No. 08/137,507, filed Oct. 18, 1993.
U.S. Appl. No. 08/310,078, filed Sep. 22, 1994.
U.S. Appl. No. 08/616,775, filed Mar. 15, 1996.
U.S. Appl. No. 10/238,784, filed Sep. 11, 2002, Miyagi et al.
U.S. Appl. No. 10/287,630, filed Nov. 5, 2002, Miyagi et al.
U.S. Appl. No. 10/096,823, filed Mar. 14, 2002, Hirano et al.
U.S. Appl. No. 07/360,246, filed Jun. 1, 1989.
U.S. Appl. No. 07/931,509, filed Aug. 21, 1992.
U.S. Appl. No. 07/523,559, filed May 15 1990.
U.S. Appl. No. 07/834,212, filed Feb. 12, 1992.
U.S. Appl. No. 08/005,775, filed Jan. 19, 1993.
U.S. Appl. No. 08/034,811, filed Mar. 19, 1993.
U.S. Appl. No. 08/164,778, filed Dec. 10, 1993.
U.S. Appl. No. 08/407,656, filed Mar. 21, 1995.
U.S. Appl. No. 08/626,962, filed Apr. 3, 1996.
U.S. Appl. No. 09/664,832, filed Sep. 19, 2000, Yagishita et al.
U.S. Appl. No. 09/708,659, filed Nov. 9, 2000, Takeuchi et al.
U.S. Appl. No. 09/864,335, filed May 25, 2001, Sugimoto et al.
U.S. Appl. No. 10/050,865, filed Jan. 18, 2002, Ohtaka et al.
U.S. Appl. No. 10/175,838, filed Jun. 21, 2002, Yamazaki et al.
U.S. Appl. No. 10/379,533, filed Mar. 6, 2003, Takeyama et al.
U.S. Appl. No. 10/448,029, filed May 30, 2003, Hirai et al.
U.S. Appl. No. 10/460,152, filed Jun. 13, 2003, Suzuki et al.
U.S. Appl. No. 10/461,399, filed Jun. 16, 2003, Sugiura et al.
U.S. Appl. No. 10/612,146, filed Jul. 3, 2003, Miura et al.
U.S. Appl. No. 10/617,399, filed Jul. 11, 2003, Satoh.
U.S. Appl. No. 10/646,754, filed Aug. 25, 2003, Kodama et al.
U.S. Appl. No. 10/647,337, filed Aug. 26, 2003, Sakuyama et al.
U.S. Appl. No. 10/665,463, filed Sep. 22, 2003, Shibaki et al.
U.S. Appl. No. 10/675,948, filed Oct. 2, 2003, Shinkai et al.
U.S. Appl. No. 10/659,349, filed Sep. 11, 2003, Nomizu et al.
U.S. Appl. No. 10/666,248, filed Sep. 22, 2003, Iwai et al.
U.S. Appl. No. 10/875,277, filed Jun. 25, 2004, Shoji et al.
U.S. Appl. No. 11/124,276, filed May 9, 2005, Miyahara et al.
U.S. Appl. No. 11/156,552, filed Jun. 21, 2005, Nakagawa et al.
U.S. Appl. No. 11/167,821, filed Jun. 28, 2005, Nakazato et al.
U.S. Appl. No. 11/333,702, filed Jan. 18, 2006, Shoji et al.
U.S. Appl. No. 11/370,057, filed Mar. 8, 2006, Yamada et al.
U.S. Appl. No. 11/370,823, filed Mar. 9, 2006, Nakagawa et al.
U.S. Appl. No. 11/452,411, filed Jun. 14, 2006, Shoji et al.
U.S. Appl. No. 11/493,816, filed Jul. 27, 2006, Takahashi et al.
U.S. Appl. No. 11/875,132, filed Sep. 18, 2007, Satoh et al.
U.S. Appl. No. 11/210,826, filed Aug. 25, 2005, Matsuura et al.
U.S. Appl. No. 12/120,702, filed May 15, 2008, Hirai.
Genichi Taguchi, "Technical Developments in the MT System", Cover pp. I-VIII, pp. 1-467 (with partial English translation), (Publication dated: May 2002).

* cited by examiner

- ACQUIRE INFORMATION $x_j$ (j: TYPE) — 3-1
- STANDARDIZE VARIOUS PIECES OF INFORMATION $X_j = (x_j - y_j)/\sigma_j$ — 3-2
- $D^2 = (1/k) \Sigma a_{pq} X_p X_q$ — 3-3

- DETERMINE INDEX VALUE CALCULATION EXPRESSION — 4-1
- ACQUIRE VARIOUS PIECES OF INFORMATION — 4-2
- CALCULATE INDEX VALUE — 4-3
- DECISION · OUTPUT — 4-4

ABNORMAL STATE OCCURRENCE PREDICTING METHOD, STATE DECIDING APPARATUS, AND IMAGE FORMING SYSTEM

CROSS-REFERENCE TO RELATED APPLICATIONS

The present document incorporates by reference the entire contents of Japanese priority document, 2003-184929 filed in Japan on Jun. 27, 2003.

BACKGROUND OF THE INVENTION

1) Field of the Invention

The present invention relates to an image forming system such as a copying machine, a printer, or a facsimile, an abnormal state occurrence predicting method in the image forming apparatus, and a state deciding apparatus that decides a state of the image forming apparatus.

2) Description of the Related Art

In an image forming apparatus of an electronic photographing scheme, maintenance such as repair, and replacing consumable articles like toner and a photosensitive member needs to be performed. When a failure occurs, all or some of the functions of the apparatus must be stopped until repair is finished, and a user has to suffer a time loss. Therefore, if an occurrence of an abnormal state such as occurrence of a failure, or the need for replacing a unit or parts is predicted, and if necessary maintenance is performed in advance, the down time can reduce.

Japanese Patent Application Laid-Open Publication No. 2001-175328 discloses a conventional method of predicting occurrence of an abnormal state such as the failure, the end of life of a spare part, or the like. This method performs a statistic process, analogism, or the like to pieces of information such as sensing information detected by various sensors arranged in the image forming apparatus.

However, the above method can predict the possibility of occurrence of an abnormal state, but cannot predict a time for occurrence of the abnormal state. If the time for occurrence of the abnormal state in the image forming apparatus can be predicted, maintenance can be performed at appropriate time depending on the degree of urgency of maintenance. Therefore, it is desired to predict, not only the possibility of occurrence of an abnormal state in the image forming apparatus but also a time when the abnormal state might occur.

SUMMARY OF THE INVENTION

It is an object of the invention to at least solve the problems in the conventional technology.

an abnormal state occurrence predicting method according to an aspect of the present invention predicts an occurrence of an abnormal state of an image forming apparatus. The method includes acquiring pieces of information of different types related to a state of the image forming apparatus; calculating an index value based on the pieces of information acquired; and deciding a change in a subsequent state of the image forming apparatus, based on a temporal change in the index value calculated.

A state deciding apparatus according to another aspect of the present invention decides a state of an image forming apparatus. The state deciding apparatus includes an information acquiring unit that acquires pieces of information of different types related to the state of the image forming apparatus; an index value calculating unit that calculates an index value based on the pieces of information acquired; and a state change deciding unit that decides a change in a subsequent state of the image forming apparatus, based on a temporal change in the index value calculated.

An image forming system according to still another aspect of the present invention includes an image forming device that forms an image on a recording medium; and a state change deciding device that decides a change in a state of the image forming device. The state change deciding device is a state deciding apparatus and includes an information acquiring unit that acquires pieces of information of different types related to the state of the image forming device; an index value calculating unit that calculates an index value based on the pieces of information acquired; and a state change deciding unit that decides a change in a subsequent state of the image forming device, based on a temporal change in the index value calculated.

The other objects, features, and advantages of the present invention are specifically set forth in or will become apparent from the following detailed description of the invention when read in conjunction with the accompanying drawings.

DETAILED DESCRIPTION

Exemplary embodiments of an abnormal state occurrence predicting method, a state deciding apparatus, and an image forming system according to the present invention will be described below with reference to the accompanying drawings.

Figure 1:
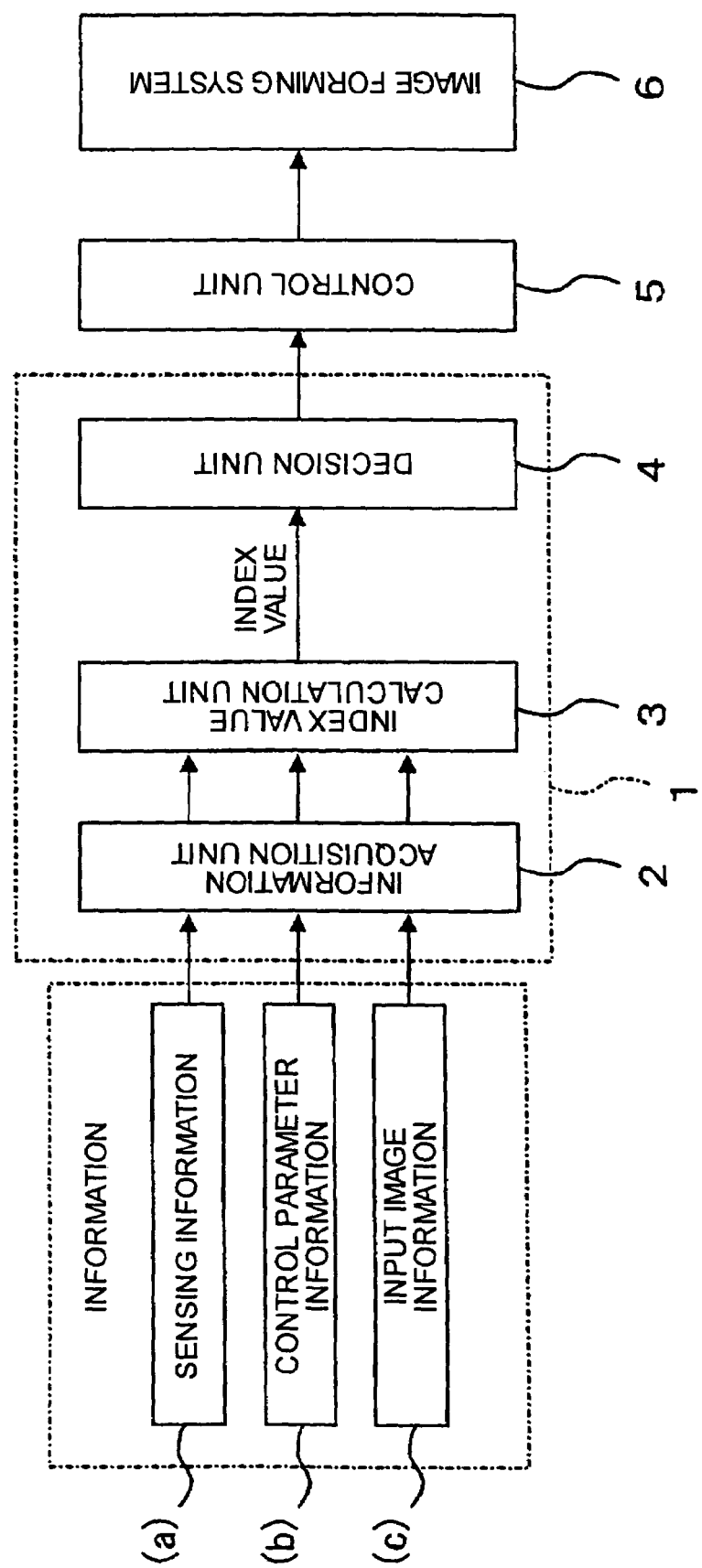
FIG. 1 illustrates a configuration of an abnormal state occurrence prediction system.

FIG. 1 illustrates a basic configuration of an abnormal state occurrence prediction system. The abnormal state occurrence prediction system includes a state decision apparatus that can employ an abnormal state occurrence prediction method according to the present invention. A state decision apparatus 1 includes an information acquisition unit 2, an index value calculation unit 3, and a decision unit 4. The information acquisition unit 2 acquires pieces of information of different types related to an image forming operation of the image forming apparatus. The index value calculation unit 3 calculates only an index value based on the pieces of information acquired by the information acquisition unit 2. The decision unit 4 decides (or predicts) a subsequent change in state of the image forming apparatus on the basis of a temporal change in the index value calculated by the index value calculation unit 3. A control unit 5 uses the temporal change in the index value calculated and the decision made by the decision unit 4, to controls devices in an image forming system 6.

The information acquisition unit 2 acquires various pieces of information (described later), and includes various sensors that detect various pieces of sensing information, the control unit 5, a communication interface that is used to transmit/receive data to/from an image data processing unit (not shown), and the like. The information acquisition unit 2 transmits a request for data acquisition to the various sensors, the control unit 5, and the image data processing unit. The information acquisition unit 2 can receive the various pieces of sensing information from the various sensors, control parameter information from the control unit 5, and input image information from the image data processing unit.

The control unit 5 includes a CPU, RAM, ROM, an I/O interface unit, and the like.

The index value calculation unit 3 and the decision unit 4 may include single-purpose LSIs or the like independently of the control unit 5, and may be constituted by sharing hardware resources such as a CPU that includes the control unit 5.

The information acquired by the information acquisition unit 2 and input to the index value calculation unit 3 includes sensing information (a), control parameter information (b), input image information (c), and the like.

The sensing information consists of data obtained by various sensors arranged inside or around the image forming apparatus. The sensing information includes dimensions of the units of the apparatus, the speed of a movable member in the apparatus, time (timing), weight, current, potential, vibration, sound, magnetic force, light intensity, temperature, humidity, and the like.

The control parameter information is general information accumulated as a result of control by the apparatus. The control parameter information includes an operation history of a user, power consumption, toner consumption, history of various image forming condition settings, warning history, and the like.

The input image information is obtained from information about image data that is input to the image forming system 6. The input image information includes a number of accumulated color pixels, a ratio of a character part, a ratio of a halftone part, a ratio of color characters, a distribution of toner consumption in a main scanning direction, RGB signals (total amount of toner in units of pixels), an original size, a rimmed original, the types (sizes and fonts) of characters, and the like.

Figure 2:
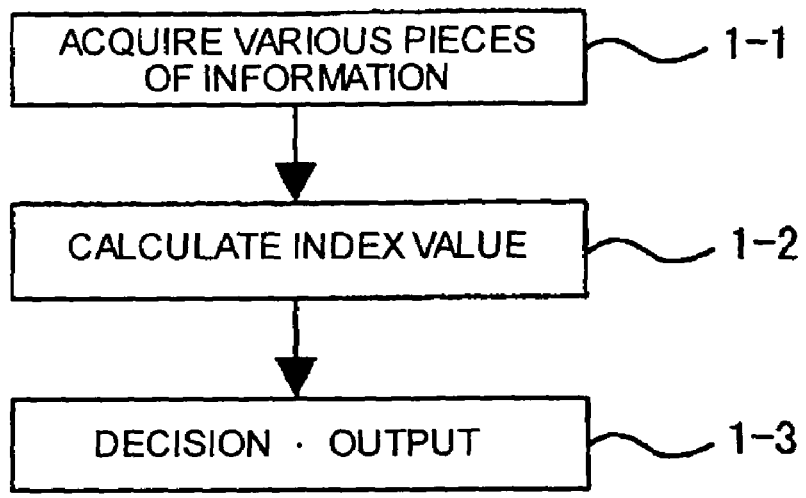
FIG. 2 is a flowchart of the basic operation of the abnormal state occurrence prediction system.

FIG. 2 is a flowchart of the basic operation of the abnormal state occurrence prediction system. The pieces of information of the different types related to states of the image forming apparatus are input to the state decision apparatus 1 of the abnormal state occurrence prediction system (step 1-1). The information acquisition unit 2 acquires the pieces of information of the different types whenever required. In the index value calculation unit 3, only one index value is calculated by a calculation method that is determined on the basis of the information acquired (step 1-2). The temporal change in the index value calculated is used to decide an occurrence of an abnormal state in the image forming apparatus, or is output to a display or an external apparatus (step 1-3).

Before calculating the index value, a calculation method (calculation expression) must be determined. In the embodiment, multi-dimensional spaces, in which different coordinate axes are set, are defined for the input information, and index values are calculated as distances in the multi-dimensional spaces. Therefore, various combinations of the information acquired in FIG. 1 are calculated during the normal operation of the image forming apparatus.

Figure 3:
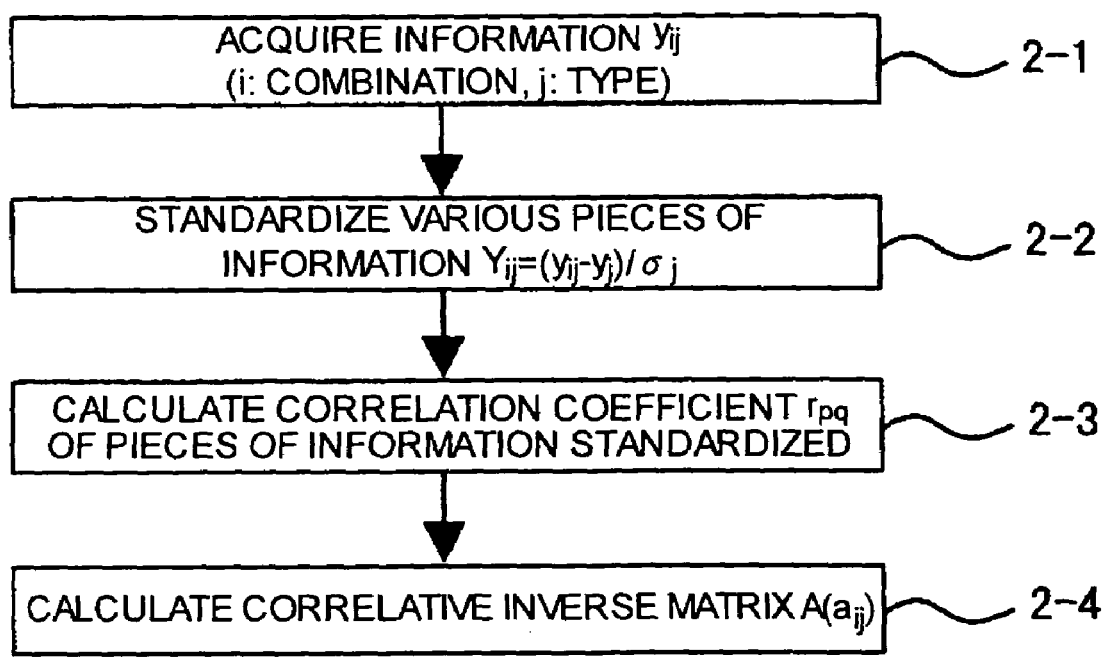
FIG. 3 is a flowchart of a procedure for determining a calculation expression that is used to calculate an index value.

FIG. 3 is a flowchart of a procedure for determining a calculation method (calculation expression) used to calculate the index value n combinations of k pieces of information related to a state of the image forming apparatus are acquired while the image forming apparatus is operated (step 2-1). The acquisition of the information is described above. A concrete example of the information will be described later.

Table 1 given below shows the configuration of the acquired information. Under the first condition (for example, the first day, the first apparatus, or the like), k data are obtained. These data are defined as $y_{11}, y_{12}, \ldots, y_{1k}$. Similarly, data obtained under the next condition (the second day, the second apparatus, or the like) are defined as $y_{21}, y_{22}, \ldots, y_{2k}$. Thus, n combinations of data are obtained.

TABLE 1

| Combination | Type of Information | | | |
|---|---|---|---|---|
| Number | (1) | (2) | ... | (k) |
| 1 | $y_{11}$ | $y_{12}$ | ... | $y_{1k}$ |
| 2 | $Y_{21}$ | $y_{22}$ | ... | $y_{2k}$ |
| . | | | | |
| . | | | | |
| . | | | | |
| n | $y_{n1}$ | $y_{n2}$ | ... | $y_{nk}$ |
| Average | $y_1$ | $y_2$ | ... | $y_k$ |
| Standard Deviation | $\sigma_1$ | $\sigma_2$ | ... | $\sigma_k$ |

Raw data (e.g., $y_{ij}$) is standardized by an average ($y_j$) and a standard deviation ($\sigma_j$) (step 2-2). Table 2 shows a result obtained by standardizing the data shown in Table 1 using the expression (1)

$$Y_{ij} = (y_{ij} - y_j)/\sigma_j \tag{1}$$

TABLE 2

| | Type of Information | | | |
|---|---|---|---|---|
| Combination Number | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| . | | | | |
| . | | | | |
| . | | | | |
| n | $y_{n1}$ | $y_{n2}$ | ... | $y_{nk}$ |
| Average | 0 | 0 | ... | 0 |
| Standard Deviation | 1 | 1 | ... | 1 |

All correlation coefficients $r_{pq}$ ($=r_{qp}$) between two combinations of data of k combinations of data are calculated by using an expression indicated by Numerical Expression 2, and are expressed by a matrix R as indicated by Numerical Expression 3 (step 2-3). In addition, the inverse matrix of the matrix R of the correlation coefficients is calculated. The obtained result is expressed by a matrix A as indicated by Numerical Expression 4 (step 2-4). "Σ" in the expression indicated by Numerical Expression 2 indicates a summation related to a suffix i.

[Numerical Expression 2]

$$r_{pq} = r_{qp} = \frac{\sum (Y_{ip}Y_{iq})}{\left(\sum Y_{ip}^2 \sum Y_{iq}^2\right)^{1/2}} \quad (2)$$

[Numerical Expression 3]

Correlation Coefficient Matrix $$R = \begin{pmatrix} 1 & r_{12} & r_{13} & \cdots & r_{1k} \\ r_{21} & 1 & r_{23} & \cdots & r_{2k} \\ r_{31} & r_{32} & 1 & \cdots & r_{3k} \\ \cdots & \cdots & \cdots & \cdots & \cdots \\ r_{k1} & r_{k2} & r_{k3} & \cdots & 1 \end{pmatrix} \quad (3)$$

[Numerical Expression 4]

Inverse Matrix $$A = \begin{pmatrix} a_{11} & a_{12} & a_{13} & \cdots & a_{1k} \\ a_{21} & a_{22} & a_{23} & \cdots & a_{2k} \\ a_{31} & a_{32} & a_{33} & \cdots & a_{3k} \\ \cdots & \cdots & \cdots & \cdots & \cdots \\ a_{k1} & a_{k2} & a_{k3} & \cdots & a_{kk} \end{pmatrix} \quad (4)$$

With the calculations, the values of calculated parameters in a calculation expression used when only the index value is calculated is determined. Since all the data groups handled here express a normal state, it is considered that the acquired various pieces of information have a predetermined correlation. When the current state is far away from the normal state to almost cause an abnormal state such as a failure, the correlations between the parameters are disturbed, and "distances" from origins (averages in a stable state) in the multidimensional spaces defined above increase. The distances mean the index values.

Figure 4:
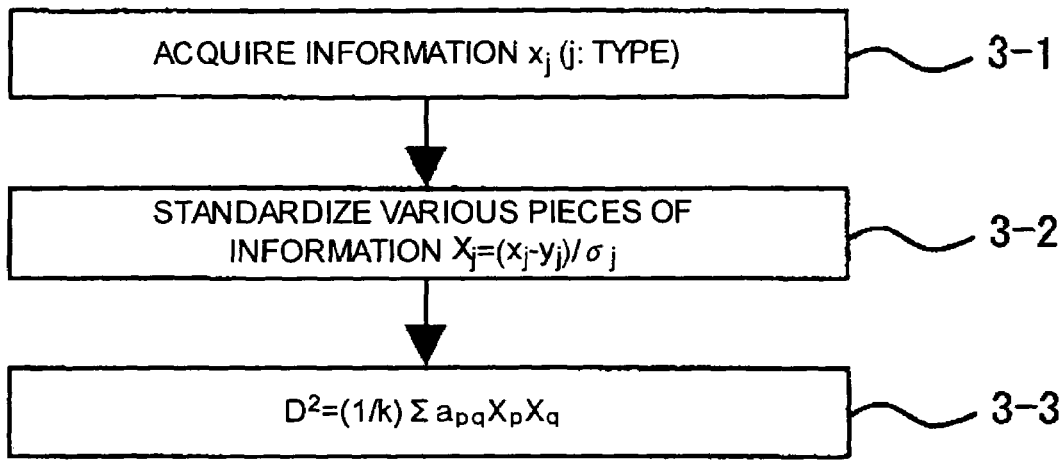
FIG. 4 is a flowchart of a procedure for calculating the index value.

FIG. 4 is a flowchart of a calculation procedure for index values in step 1-2 in FIG. 2. An index value at an arbitrary timing is calculated as follows. Data $x_1, x_2, \ldots, x_k$ of k types in an arbitrary state are acquired (step 3-1). The types of the data correspond to $y_{11}, y_{12}, \ldots, y_{1k}$ or the like. The data of the acquired information is standardized by using an expression indicated by Numerical Expression 5 (step 3-2). In this case, the standardized data are defined as $X_1, X_2, \ldots, X_k$. By a calculation expression indicated by Numerical Expression 6 determined by using elements $a_{kk}$ of the inverse matrix A that has been calculated, an index value $D^2$ is calculated. A value D that is the square root of the index value is called "Mahalanobis's distance". "Σ" in the expression indicated by Numerical Expression 6 indicates a summation related to the suffixes p and q.

[Numerical Expression 5]

$$X_j = (x_j - y_j)/\sigma_j \quad (5)$$

[Numerical Expression 6]

$$D^2 = (1/k)\Sigma a_{pq} X_p X_q \quad (6)$$

Figure 5:
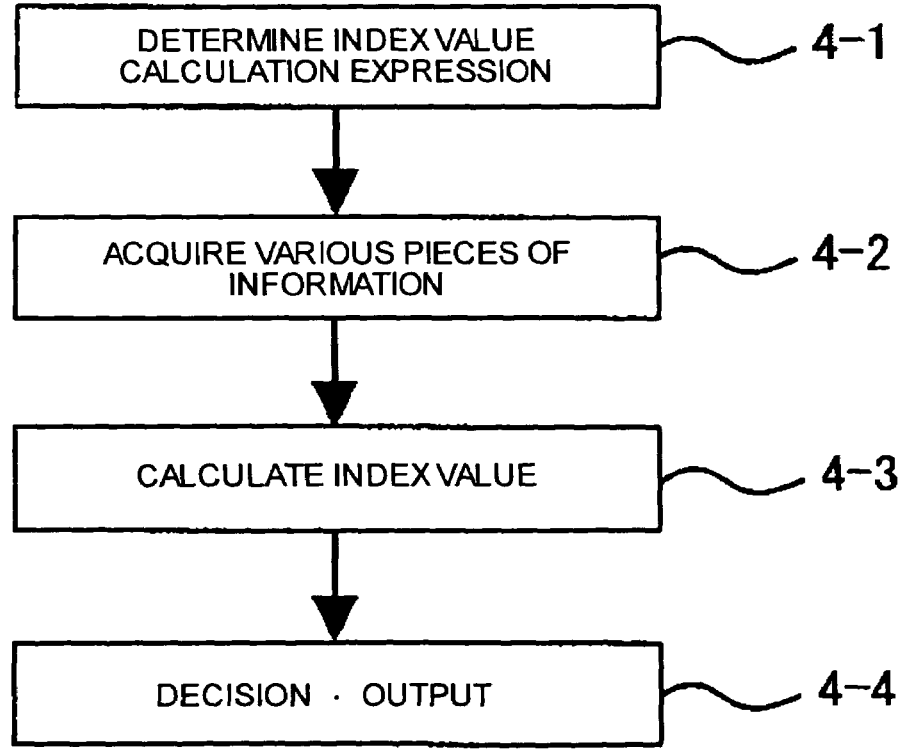
FIG. 5 is a flowchart of a basic operation of an abnormal state occurrence prediction system according to a modification.

The process that determines the calculation method for the index values, i.e., the process that determines the calculation expression for the index values and the process that calculates the index value D by using the calculation expression to update the index value D may be continuously executed while the image forming system 6 is operated. In this case, the flow chart of the processes is obtained by combining the process step shown in FIG. 2 and the process step in FIG. 3, as shown in FIG. 5.

A configuration of an image forming apparatus to which the present invention can be applied and an operation of the image forming apparatus will be described below.

Figure 6:
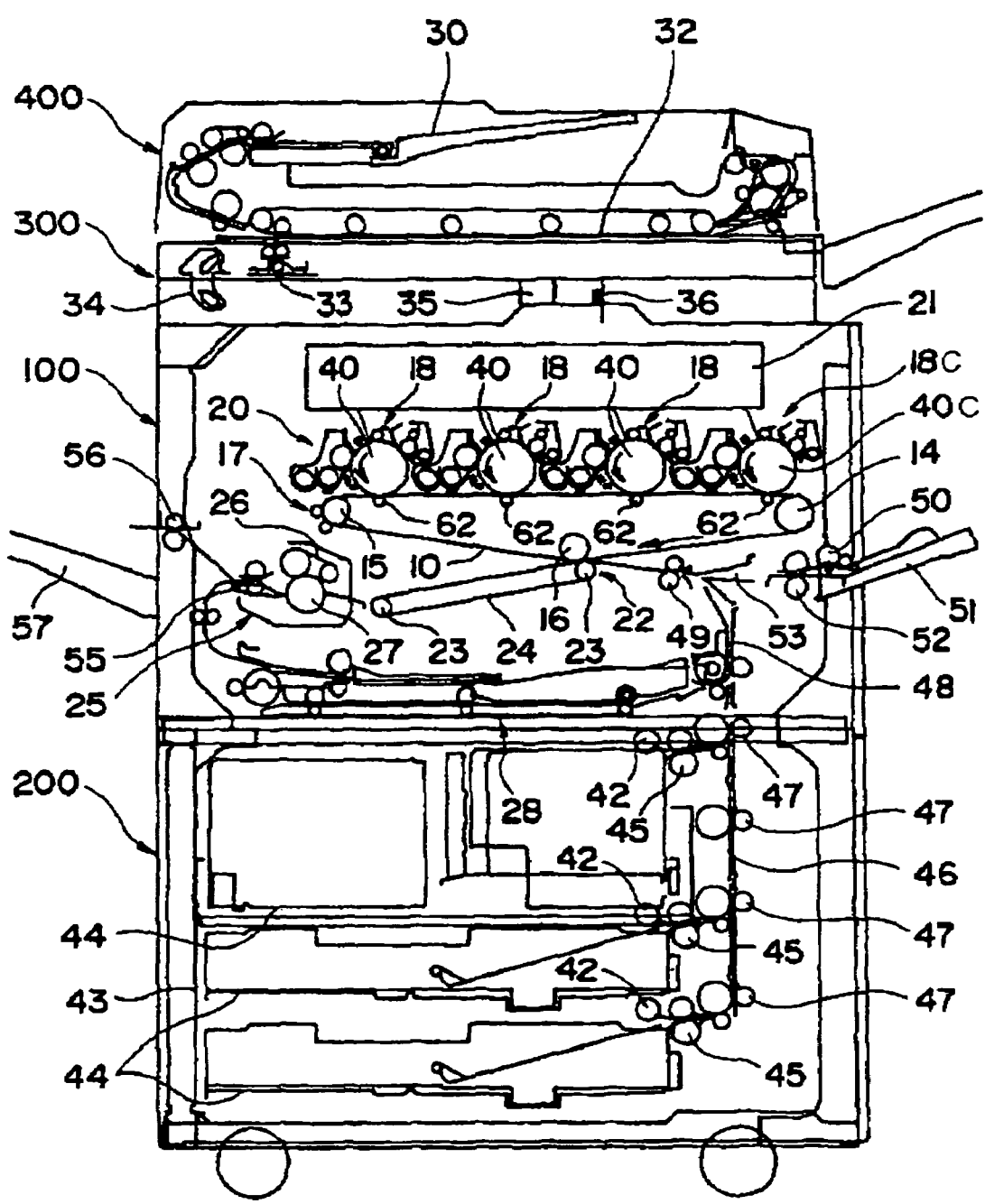
FIG. 6 illustrates a configuration of a color copying machine.

FIG. 6 illustrates a configuration of a color copying machine serving as an image forming apparatus using an electronic photographing scheme according to the embodiment. The image forming system 6 serving as the image forming unit of the color copying machine comprises a printer unit 100 that is a copying machine main body, a paper feeding unit 200, a scanner unit 300, and a original convey unit 400. The scanner unit 300 is fixed on the copying machine main body 100, and an original convey unit 400 constituted by an original automatic convey device (ADF) is fixed on the scanner unit 300. In addition, the copying machine main body also comprises the control unit 5 (see FIG. 1) serving as a control unit that controls the operations in the devices in the color copying machine. The control unit 5 is constituted by a CPU, a RAM, a ROM, an I/O interface unit, and the like as described above.

The scanner unit 300 allows a read sensor 36 to read the image information of an original placed on a contact glass 32 and transmits the read image information to the control unit. The control unit controls a laser, an LED, or the like (not shown) arranged in an exposure device 21 in the printer unit 100 on the basis of the image information received from the scanner unit 300 to irradiate a laser write beam L on photosensitive drums 40Bk, 40Y, 40M, and 40C. With this irradiation, electrostatic latent images are formed-on the surfaces of the photosensitive drums 40Bk, 40Y, 40M, and 40C, and the latent images are developed into toner images through a predetermined developing process.

The printer unit 100 comprises not only the exposure device 21 but also, a primary transfer device 62, a secondary transfer device 22, a fixing device 25, a delivery device, a toner supply device (not shown), a toner supply device and the like. The developing process described above will be described later in detail.

The paper feeding unit 200 comprises paper feeding cassettes 44 held in a paper bank 43 in a plurality of levels, a paper feeding roller 42 that forwards transfer paper serving as a recording medium from a paper feeding cassette, a separation roller 45 that separates the forwarded transfer paper P to send the transfer paper P, a convey roller 47 that conveys the transfer paper P to a feeding path 48 of the printer unit 100, and the like. In the apparatus according to the embodiment, in addition to the paper feeding unit, a manual paper feeding tray 51 that can also perform manual paper feeding and that is used for manual paper feeding and a separation roller 52 that separates sheets of transfer paper P on the manual paper feeding tray one by one toward a manual paper feeding path 53 are arranged on a side surface of the apparatus. A resist roller 49 delivers only one sheet of transfer paper P placed on the paper feeding cassette 44 or the manual paper feeding tray 51 and sends the sheet of transfer paper to a secondary transfer nip portion located between an intermediate transfer belt 10 serving as an intermediate transfer body and the secondary transfer device 22.

In the configuration, when a color image is to be copied, an original is set on an original table 30 of the original convey unit 400, or the original convey unit 400 is opened to set an original on the contact glass 32 of the scanner unit 300, and the original convey unit 400 is closed to press the original. When a start switch (not shown) is depressed, the original is conveyed onto the contact glass 32 when the original is set on the original convey unit 400. On the other hand, when the original is set on the contact glass 32, the scanner unit 300 is immediately driven to cause a first traveling body 33 and a second traveling body 34 to travel. A beam from a light source is reflected by the first traveling body 33, and a reflected beam from the original surface is reflected to the second traveling body 34. The beam is reflected by the mirror of the second traveling body 34 and input to the read sensor 36 through the image forming lens 35 to read image information. When the image information is received from the scanner unit, the laser writing and a developing process (to be described later) are performed to form toner images on the photosensitive drums 40Bk, 40Y, 40M, and 40C. At the same time, one of the four resist rollers is operated to feed the transfer paper P having a size depending on the image information.

Accordingly, a drive motor (not shown) rotationally drives one of the support rollers 14, 15, and 16 to dependently rotate other two support rollers, and the intermediate transfer belt 10 is conveyed with the rotation of these rollers. At the same time, image forming units 18 rotate the photosensitive drums 40Bk, 40Y, 40M, and 40C to form single-color images of black, yellow, magenta, and cyan on the photosensitive drums 403k, 40Y, 40M, and 40C, respectively. With the conveyance of the intermediate transfer belt 10, these single-color images are sequentially transferred to form a synthesized color image on the intermediate transfer belt 10.

On the other hand, one of the paper feeding rollers 42 of the paper feeding unit 200 is selectively rotated to forward transfer sheets of paper P from one of the paper feeding cassettes 44. The separation roller 45 separates the sheets of transfer paper P one by one and puts a sheet of transfer paper P into the feeding path 46. The convey roller 47 guides the sheet of transfer paper P to the feeding path 48 in the copying machine main body 100 and hits the sheet of transfer paper P against the resist roller 49 to stop the sheet of paper. In other alternative, a paper feeding roller 50 is rotated to forward sheets of transfer paper P on the manual paper feeding tray 51, separated one by one by the separation roller 52, put into the manual paper feeding path 53, and similarly hit against the resist roller 49 to stop the sheet of transfer paper P. The resist roller 49 is rotated at a timing matched with the timing of the synthesized color image on the intermediate transfer belt 10, and the sheet of transfer paper P is sent to the secondary nip portion serving as a contact unit between the intermediate transfer belt and a secondary transfer roller 23. The color image is secondarily transferred by the influence of a transfer electric field and a contact pressure generated at the nip to record the color image on the sheet of transfer paper P.

The sheet of transfer paper P to which the image is transferred is sent to the fixing device 25 with a convey belt 24 of the secondary transfer device. In the fixing device 25, after the toner image is fixed by causing a pressing roller 27 to apply pressure and heat to the toner image, and a delivery roller 56 delivers the sheet of transfer paper P onto a paper delivery tray 57.

The details of the printer unit 100 in the color copying machine according to the embodiment will be described below.

Figure 7:
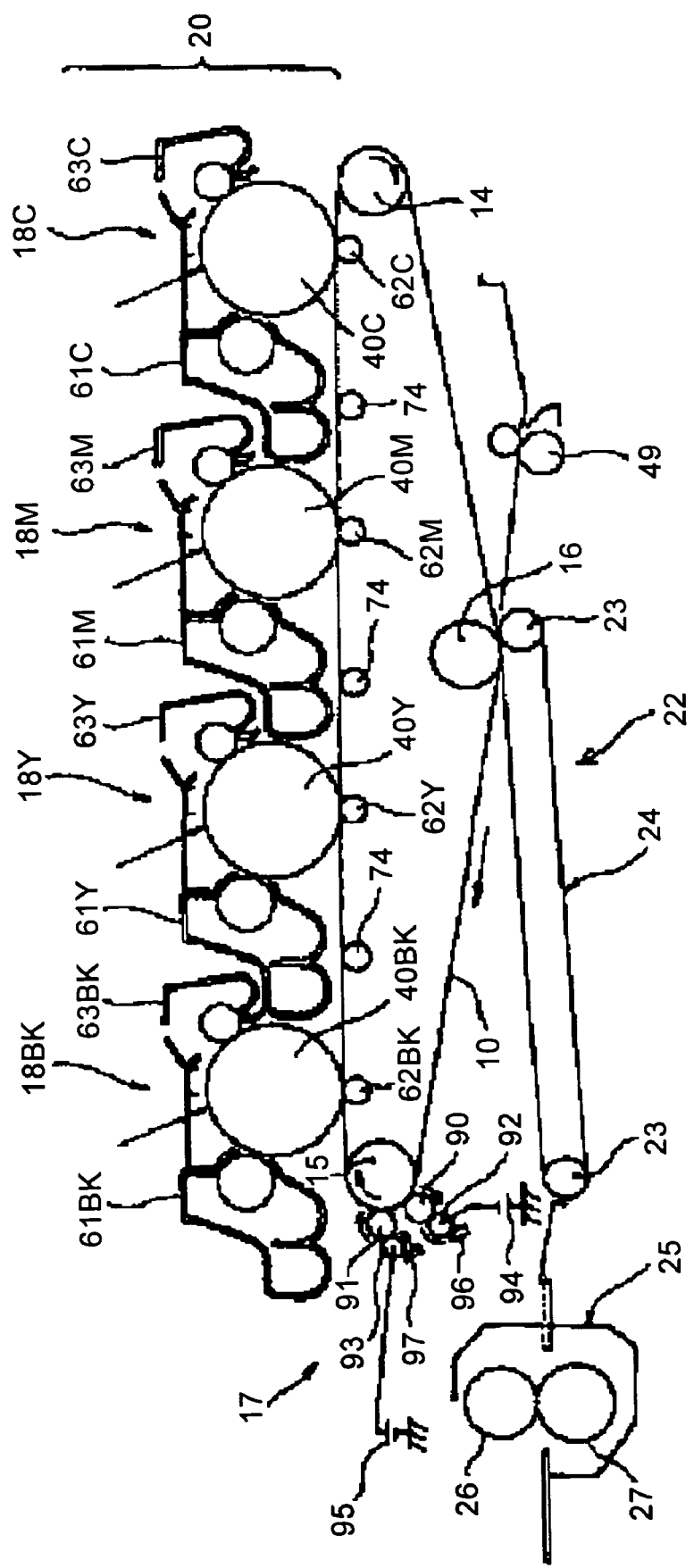
FIG. 7 is an enlarged view of a main part of a printer unit in the color copying machine.

FIG. 7 is an enlarged view showing a main part of the printer unit 100. The printer unit 100 comprises an intermediate transfer belt 10 serving as an intermediate transfer belt and supported by three support rollers 14, 15, and 16, four photosensitive drums 40Bk, 40Y, 40M, and 40C serving as latent image carriers each of which carries a toner image of one of black, yellow, magenta, and cyan, and developing units 61Bk, 61Y, 61M, and 61C serving as developing units that form toner images on the surfaces of the drum surfaces. The printer unit 100 further comprises photosensitive body cleaning devices 63Bk, 63Y, 63M, and 63C. Four image forming units 18Bk, 18Y, 18M, and 18C that comprise the photosensitive drums 40Bk, 40Y, 40M, and 40C, the developing units 61Bk, 61Y, 61M, and 61C, and the photosensitive body cleaning devices 63Bk, 63Y, 63M, and 63C, respectively, constitute a tandem image forming device 20. A belt cleaning device 17 that removes residual toner remaining on the intermediate transfer belt 10 after a toner image is transferred to a sheet of transfer paper is arranged on the left of the support roller 15 in FIG. 7.

The belt cleaning device 17 has two fur brushes 90 and 91 as cleansing members. As the fur brushes 90 and 91 (φ20 millimeters), acrylic carbon (6.25 D/F) having a resistance of $1 \times 10^7$ and planted at 0.1 million/inch$^2$ is used. The fur brushes 90 and 91 are arranged such that the fur brushes 90 and 91 are brought into contact with the intermediate transfer belt 10 and rotated. A power supply (not shown) applies biases having different polarities to the fur brushes 90 and 91, respectively. Metal rollers 92 and 93 are brought into contact with the fur brushes 90 and 91, respectively, to make it possible to rotate the metal rollers 92 and 93 in a forward or backward direction with respect to the fur brushes.

In the embodiment, a power supply 94 applies a negative voltage to the metal roller 92 on the upstream side of the intermediate transfer belt 10 in the rotating direction, and a power supply 95 applies a positive voltage to the metal roller 93 on the downstream side. The distal ends of blades 96 and 97 are brought into press contact with the power supply 99 metal rollers 92 and 93, respectively. With rotation of the intermediate transfer belt 10 in the direction of an arrow, the fur brush 90 on the upstream side is used first to apply, e.g., a negative bias, thereby cleaning the surface of the intermediate transfer belt 10. If a voltage of −700 volts is applied to the metal roller 92, the fur brush 90 has a voltage of −400 volts, and positively charged toner on the intermediate transfer belt 10 can be transferred to the fur brush 90 side. The toner transferred to the fur brush side is transferred from the fur blush 90 to the metal roller 92 by a potential difference, and the toner is craped out by the blade 96.

In this manner, toner on the intermediate transfer belt 10 is removed by the fur blush 90. However, a large amount of toner still remains on the intermediate transfer belt 10. The toner is negatively charged by a negative bias applied by the fur blush 90. It is considered that the toner is charged by injection of electric charge or discharge. A positive bias is applied by using the fur brush 91 to clean the intermediate transfer belt 10, so that the toner can be removed. The removed toner is transferred from the fur brushes 90 and 91 to the power supply 94 metal rollers 92 and 93 by a potential difference, and the toner is craped out by the blade 97. The toner craped out by the blades 96 and 97 is recovered and put in a tank (not shown). The toner may be returned to the developing device 61 by using a toner recycle device (to be described later).

Although toner is almost removed from the surface of the intermediate transfer belt 10 that is cleaned with the fur blush 91, a small amount of toner still remains on the surface. The toner remaining on the intermediate transfer belt 10 is positively charged by a positive bias applied to the fur brush 91 as described above. The positively charged toner is transferred to the photosensitive drums 40Bk, 40Y, 40M, and 40C by a transfer electric field applied at a primary transfer position, and can be recovered by the photosensitive body cleaning device 63.

A secondary transfer device 22 is arranged on the opposite side of the tandem image forming device 20 with respect to the intermediate transfer belt 10. The secondary transfer device 22 is constituted such that, in the embodiment, the convey belt 24 is hooked between the two rollers 23. The secondary transfer device 22 is brought into press contact with the third support roller 16 through the intermediate transfer belt 10 to form a secondary transfer nip portion, and a color toner image on the intermediate transfer belt 10 is secondarily transferred onto a sheet of transfer paper. After the secondary transfer, the residual toner remaining on the intermediate transfer belt 10 is removed by the fur brushes 90 and 91 belt cleaning device 17 after the image is transferred. The intermediate transfer belt 10 prepares for the next image formation. The secondary transfer device 22 also comprises a transfer paper P carrying function that carries a sheet of transfer paper P on which the image is transferred to the fixing device 25. As a matter of course, a transfer roller or a non-contact charger may be arranged as the secondary transfer device 22. In such a case, it is difficult that the secondary transfer device 22 comprises the transfer paper P carrying function.

In many cases, the resist roller 49 is generally used in contact with the ground. However, a bias can also be applied to remove paper powder from the transfer paper P. For example, the bias is applied by using a conductive rubber roller. As the material of the rubber roller, conductive NBR rubber having a diameter of ϕ18 millimeters and a surface thickness of 1 millimeter is used. An electric resistance is a volume resistance of the rubber material, i.e., about $10 \times 10^9$ Ω·cm, and an application voltage of about −800 volts is applied to a side (front surface side) to which toner is transferred. A voltage of +200 volts is applied to the rear surface side of paper.

In a general intermediate transfer system, paper powder does not easily move to a photosensitive drum. For this reason, the necessity of considering paper powder transfer is small, and the photosensitive drum may be grounded. As the application voltage, a DC bias is applied. However, an AC voltage having a DC offset may be used to more uniformly charge the sheet of transfer paper P. The paper surface passing through the resist roller 49 applied with the bias is slightly negatively charged. Therefore, in transfer from the intermediate transfer belt 10 to the sheet of transfer paper P, the transfer conditions are different from those set when no voltage is applied to the resist roller 49, and the transfer conditions may be changed.

In the embodiment, a transfer paper reversing device 28 (see FIG. 6) that reverses the sheet of transfer paper P to record images on both the surfaces of the sheet of transfer paper P is arranged in parallel to the tandem image forming device 20. In this manner, after the image is fixed on one surface of the sheet of transfer paper, the course of the sheet of transfer paper is switched to the transfer paper reversing device side by a switching pawl. At this position, the sheet of transfer paper is reversed, and the toner image is transferred by the secondary transfer nip again. Thereafter, the sheet of transfer paper P may be delivered on the paper delivery tray.

The tandem image forming device 20 will be described below.

Figure 8:
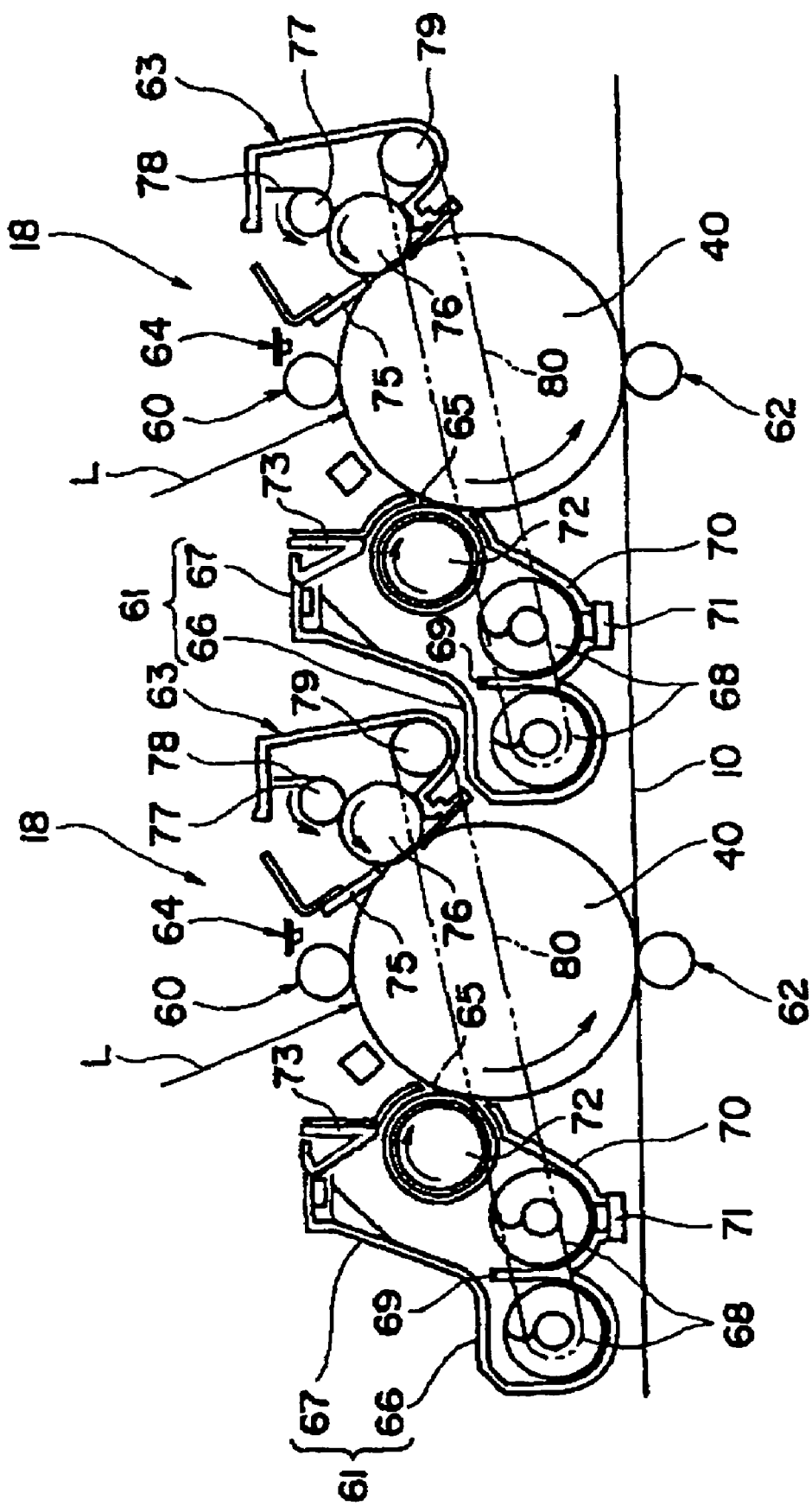
FIG. 8 is a partially enlarged view of a tandem image forming device included in the printer unit.
Figure 14:
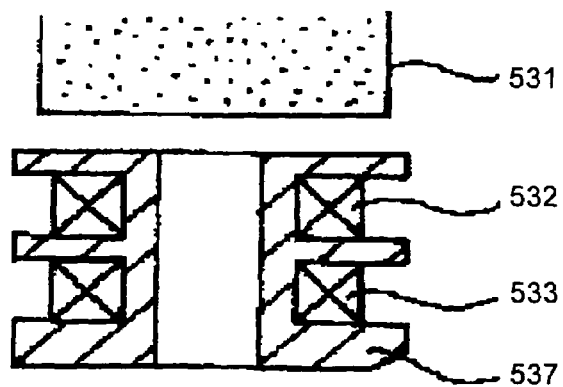
FIG. 14 is an assembly diagram of coils in the toner concentration detecting unit.

FIG. 8 is a partially enlarged view of the tandem image forming device 20. Since the four image forming units 18Bk, 18Y, 18M, and 18C have the same configurations, respectively, the four color symbols Bk, Y, M and C are omitted, and the configuration of one of the units will be described in detail. As shown in FIG. 14, in the image forming unit, a charging device 60, a developing device 61, a primary transfer device 62, a photosensitive body cleaning device 63, an ionizer 64, and the like are arranged around the photosensitive drums 40Bk, 40Y, 40M, and 40C. The photosensitive drums 40Bk, 40Y, 40M, and 40C, in the shown example, are drums each of which is formed by coating an organic photosensitive material having photosensitivity on a material tube consisting of aluminum or the like to form a photosensitive layer. However, photosensitive drums 40Bk, 40Y, 40M, and 40C may be constituted by endless belts, respectively.

Although not shown, at least photosensitive drums 40Bk, 40Y, 40M, and 40C are arranged, and a process cartridge is constituted by all or some of units constituting the image forming unit 18. The image forming units 18 maybe detachably arranged in the copying machine main body 100 at once to improve the maintenance properties. Of the units constituting the image forming units 18, the charging device 60 is formed in the form of a roller in the shown example and brought into contact with the photosensitive drums 403k, 40Y, 40M, and 40C to apply a voltage, so that the photosensitive drums 40Bk, 40Y, 40M, and 40C are charged. As a matter of course, charging may also be performed by a non-contact scorotron charger.

As the developing device 61, a one-component developing agent maybe used. However, in the shown example, a two-component developing agent consisting of a magnetic carrier and non-magnetic toner is used. A stirring unit 66 that conveys the two-component developing agent while stirring the two-component developing agent, that supplies the two-component developing agent to a developing sleeve 65, that causes the two-component agent to adhere to the developing sleeve 65, and a developing unit 67 that transfers the toner of the two-component agent adhering the developing sleeve 65 to the photosensitive drums 40Bk, 40Y, 40M, and 40C are arranged. The stirring unit 66 is located at a level lower than that of the developing unit 67.

The stirring unit 66 has two parallel screws 68. The two screws 68 are partitioned by a partition plate 69 except for both the end portions. A toner concentration sensor 71 is arranged in a developing case 70.

In the developing unit 67, the developing sleeve 65 is arranged in opposition to the photosensitive drums 40Bk, 40Y, 40M, and 40C through the opening of the developing case 70, and a magnet 72 is fixed in the developing sleeve 65. A doctor blade 73 is arranged such that the distal end of the doctor blade 73 is close to the developing sleeve 65. In the shown example, an interval between the doctor blade 73 and the developing sleeve 65 at the closest portion is set to be 500 micrometers.

The developing sleeve 65 is a non-magnetic rotatable sleeve. A plurality of magnets 72 are arranged in the developing sleeve 65. The magnet 72 is designed to cause magnetic force to act when the developing agent passes through a predetermined position. In the shown example, the diameter of the developing sleeve 65 is set to be ϕ18 millimeters, the surface of the developing sleeve 65 is subjected to a sandblast process or a process of forming a plurality of grooves each having a depth of 1 to several millimeters, so that a surface roughness (Rz) falls within the range of 10 to 30 micrometers.

The magnet 72, for example, has polarities N1, S1, N2, S2, and S3 in a direction from the position of the doctor blade 73 in the rotating direction of the developing sleeve 65. A magnetic brush is made of the developing agent by the magnet 72 and supported on the developing sleeve 65. The developing sleeve 65 is arranged in opposition to the photosensitive drums 40Bk, 40Y, 40M, and 40C in a region on S1 side of the magnet 72 that forms the magnetic brush for the developing agent.

With the configuration, two-component developing agent is conveyed and circulated while being stirred by the two screws 68 and supplied to the developing sleeve 65. The developing agent supplied to the developing sleeve 65 is scooped up and held by the magnet 72 to form a magnetic brush on the developing sleeve 65. The magnetic brush is thinned by the doctor blade 73 to have an appropriate amount with rotation of the developing sleeve 65. The cut developing agent is returned to the stirring unit 66.

The toner of the developing agent supported on the developing sleeve 65 is transferred to the photosensitive drums 40Bk, 40Y, 40M, and 40C by a developing bias voltage applied to the developing sleeve 65 to change the electrostatic latent images on the photosensitive drums 40Bk, 40Y, 40M, and 40C into visible images, respectively. After the visible images are formed, a developing agent remaining on the developing sleeve 65 is separated from the developing sleeve 65 out of the magnetic force of the magnet 72 and returned to the stirring unit 66. When the operations are repeated, the toner concentration in the stirring unit 66 decreases. In this case, the toner concentration is detected by the toner concentration sensor 71 to supply toner to the stirring unit 66.

In the apparatus according to the embodiment, as settings of the units, the linear velocities of the photosensitive drums 40Bk, 40Y, 40M, and 40C are set at 200 mm/s each, the linear velocity of the developing sleeve 65 is set at 240 mm/s, the diameters of the photosensitive drums 40Bk, 40Y, 40M, and 40C are set at 50 millimeters each, and the diameter of the developing sleeve 65 is set at 18 millimeters. In the conditions, the developing step is performed. An amount of charge of toner on the developing sleeve 65 preferably falls within the range of −10 to −30 μC/g. A developing gap GP that is each of gaps between the photosensitive drums 40Bk, 40Y, 40M, and 40C and the developing sleeves 65 can be set to fall within the range of 0.8 millimeter to 0.4 millimeter as in a conventional art. When the developing gap GP is reduced, developing efficiency can be improved. In addition, the thickness of the photosensitive body 40 is set at 30 micrometers, the beam spot diameter of an optical system is set at 50 to 60 micrometer, and a light intensity is set at 0.47 mW. A charging (before exposure) potential V0 of the photosensitive body 40 is set at −700 volts, and potential VL (after exposure) is set at −120 volts, and a developing bias potential is set at −470 volts, i.e., a developing potential 350 volts. In the conditions, a developing step is performed.

The primary transfer device 62 is constituted by the roller-shaped primary transfer roller 62 and arranged to be in press contact with the photosensitive body 40 through the intermediate transfer belt 10. An electric conductive roller 74 is arranged between the primary transfer devices 62 such that the electric conductive roller 74 is brought into contact with a base layer 11 of the intermediate transfer belt 10. The electric conductive roller 74 prevents biases applied by the primary transfer devices 62 in transfer from flowing in the image forming units 18 that are adjacent to the primary transfer devices 62 through the base layer 11 having an intermediate resistance.

The photosensitive body cleaning device 63 uses a cleaning blade 75 consisting of, polyurethane rubber to bring the distal end of the cleaning blade 75 into press contact with the photosensitive body 40. In addition, in order to improve cleaning properties, in the embodiment, a fur brush 76 having contact conductivity and having an external periphery being in contact with the photosensitive body 40 is rotatably arranged in the direction of an arrow. A metal electric field roller 77 that applies a bias to the fur brush 76 is arranged such that the metal electric field roller 77 can be rotated in the direction of the arrow. The distal end of a scraper 78 is brought into press contact with the metal electric field roller 77. A recovery screw 79 that recovers the removed toner is also arranged.

In the photosensitive body cleaning device 63 with the configuration, the fur brush 76 that rotates in the counter direction of the photosensitive body 40 removes residual toner on the photosensitive body 40. The toner adhering to the fur brush 76 is removed by the electric field roller 77 that is applied with a bias and that rotates in the counter direction of the fur brush 76 in contact with the fur brush 76. The electric field roller 77 is cleaned by the scraper 78 to remove the toner adhering to the electric field roller 77. The toner recovered by the photosensitive body cleaning device 63 is collected on one side of the photosensitive body cleaning device 63 by the recovery screw 79, returned to the developing device 61 by a toner recycle device 80, and recycled.

The ionizer 64 uses an ionizing lamp. The ionizer 64 irradiates a beam on the photosensitive drum 40 to initialize the surface potential of the photosensitive drum 40.

The image forming process in the tandem image forming device 20 with the configuration is performed as follows. With rotation of the photosensitive drum 40, the surface of the photosensitive drum 40 is uniformly charged by the charging device 60, and a write beam L is irradiated on the photosensitive drum 40 to form an electrostatic latent image on the photosensitive drum 40. Thereafter, the developing device 61 performs developing to cause toner to adhere to the electrostatic latent image, and forms a toner image. The primary transfer device 62 primarily transfers the toner image onto the intermediate transfer belt 10. The photosensitive body cleaning device 63 removes residual toner from the surface of the photosensitive drum 40 after the image transfer, and the ionizer 64 ionizes the surface to prepare image formation again. On the other hand, the residual toner removed from the surface of the photosensitive drum is re-used in developing by a toner recycle device (to be described later). An order of colors forming an image is not limited to the order described above. The order changes depending on objects or characteristics held in the image forming apparatus.

The type of information to be acquired to predict occurrence of an abnormal state in the color copying machine having the configuration and an acquiring method will be described below.

(a) About Sensing Information

As the sensing information, a drive relationship, various characteristics of a recording medium, characteristics of a developing agent, characteristics of a photosensitive body, various process states of an electronic photograph, an environmental condition, various characteristics of a recording object, and the like are considered as objects to be acquired. The outline of the pieces of sensing information will be described below.

(a-1) Information of Drive

A rotating speed of a photosensitive drum is detected by an encoder, a current value of a drive motor is read, and a temperature of the drive motor is read.

Similarly, drive states of cylindrical or belt-like rotatable units such as a fixing roller, a paper convey roller, and a drive roller are detected.

Sound generated by drive is detected by a microphone installed inside or outside the apparatus.

(a-2) State of Paper Conveyance

The positions of the front and rear ends of conveyed paper are read by a transmissive or reflective photosensor or a contact type sensor to detect occurrence of paper jam or to read a difference between pass timings of the front and rear ends of the sheet of paper and a change of a direction vertical to a transmission direction.

Similarly, on the basis of the detected timings of the sensors, a moving speed of the sheet of paper is calculated.

Slit between a paper feed roller and a sheet of paper in paper feeding is calculated by comparing a value obtained by measuring a rotating speed of the roller and a moving distance of the sheet of paper with each other.

(a-3) Various Characteristics of Recording Medium Such as Paper

This information considerably affects image quality and the stability of paper conveyance. The information of the paper type is acquired by the following methods.

The thickness of the sheet of paper is calculated by the following method. That is, the sheet of paper is pinched by two rollers, relative displacements of the roller are detected by an optical sensor, or a displacement which is equal to a moving distance of a member lifted up by insertion of the sheet of paper is detected.

The surface roughness of the sheet of paper is calculated by the following method. That is, a guide or the like is brought into contact with the surface of the sheet of paper be fore transfer, and vibration, sliding sound, or the like generated by the contact is detected.

The brilliance of the sheet of paper is calculated by the following method. That is, a light flux having a predetermined open angle is incident at a predetermined incident angle, and a light flux reflected in a mirror surface reflecting direction and having a predetermined open angle is measured by a sensor.

The rigidity of the sheet of paper is calculated by detecting a transformation ratio (curvature) of the pressed sheet of paper.

Whether the sheet of paper is a sheet of recycled paper or not is decided by the following method. That is, a ultraviolet ray is irradiated on the sheet of paper to detect the transmittance of the sheet of paper.

Whether the sheet of paper is a sheet of backing paper or not is decided by the following method. That is, abeam is irradiated from a linear beam source such as an LED array, and a beam reflected from a transfer surface is detected by a solid-state image pickup element such as a CCD.

Whether the sheet of paper is a sheet of paper for OHP or not is decided by the following method. That is, a beam is irradiated on the sheet of paper to detect a regularly reflected beam having an angle different from that of a transmitted beam is detected.

A moisture content of the sheet of paper is calculated by measuring absorption of infrared or a μ-wave beam.

An amount of curl is detected by a photosensor, a contact sensor, or the like.

An electric resistance of the sheet of paper is obtained by the following method. A pair of electrodes (paper feeding rollers or the like) are brought into contact with a sheet of recording paper to directly measure the electric resistance, or the surface potential of the photosensitive body or the intermediate transfer body after paper transfer is measured to estimate the resistance of the sheet of recording paper on the basis of the surface potential.

(a-4) Developing Agent Characteristic

The characteristics of a developing agent (toner carrier) in the apparatus affect the bare bone of the function of an electronic photographing process. For this reason, the characteristics of the developing agent serves as an important factor for an operation or an output of the system. It is very important to obtain the information of the developing agent. As the characteristics of the developing agent, the following items are cited.

With respect to toner, charge amounts, a distribution of charge amounts, fluidity, a degree of agglutination, dimensional concentration, an electric resistance, an external additive content, a consumption of external additive or a remaining amount of external additive, fluidity, a toner concentration (mixture ratio of toner and a carrier) are cited.

With respect to a carrier, magnetic characteristics; a coat thickness, an amount of spent, and the like are cited.

It is generally difficult to independently detect the items in the image forming apparatus. Therefore, these items are detected as integrated characteristics. The integrated characteristics of the developing agent can be measured by, e.g., the following method.

A test latent image is formed on a photosensitive body and developed under predetermined developing conditions, and a reflection concentration (optical reflectance) of the formed toner image is measured.

A pair of electrodes are arranged in the developing device to measure a relationship between an application voltage and a current (resistance, dielectric constant, or the like).

A coil is arranged in the developing device to measure voltage-current characteristics (inductance).

A level sensor is arranged in the developing device to detect a developing agent capacity. As the level sensor, an optical level sensor, an electric capacitance type level sensor, or the like is used.

(a-5) Photosensitive Body Characteristic

Like the developing agent characteristics, the photosensitive body characteristics are closely related to the function of an electronic photographing process. As the pieces of information of the photosensitive body characteristics, a thickness of a photosensitive body, surface characteristics (friction coefficient and unevenness), surface potentials (before and after the processes), surface energy, scattering light, a temperature, a color, a surface position (fluctuation), a linear velocity, a potential attenuation rate, a resistance/capacitance, a surface moisture content, and the like are cited. Of these items, the following pieces of information can be detected in the image forming apparatus.

A change of the electric capacitance with a change in thickness collates with voltage-current characteristics between a detected current flowing from a charged member to a photosensitive body and a voltage simultaneously applied to the charged member with respect to a dielectric thickness of a predetermined photosensitive body, so that a film thickness is calculated.

The surface potential and the temperature can be calculated by a conventionally known sensor.

The linear velocity is detected by an encoder fixed to the rotating shaft of the photosensitive body.

Scattering light from the surface of the photosensitive body is detected by a photosensor.

(a-6) Electronic Photographing Process State

Formation of a toner image by an electronic photographing scheme is performed in the following order. That is, as well known, uniform charging of a photosensitive body, latent image formation (image exposure) by a laser beam or the like, developing by toner (color particles) having charges, transfer of the toner image to a transfer material (in a color image, overlapping on a recording medium serving as an intermediate transfer body or a final transfer material or overlapping developing on the photosensitive body in developing is performed), and fixing of the toner image to the recording medium. Various pieces of information on these stages considerably affect the image and other outputs from the system. It is important in evaluation of the stability of the system to acquire the pieces of information. As concrete examples of acquisition of the pieces of information of the electronic photo-graphing process state, the followings are cited.

A charge potential and a potential of an exposing unit are detected by a conventionally known surface potential sensor.

A gap between a charged member and a photosensitive body in non-contact charging is detected by measuring an amount of light caused to pass through the gap.

An electromagnetic wave generated by charging is captured by a wide-band antenna.

Sound generated by charging

Exposure strength

Wavelength of exposure light

As a method of acquiring various states of a toner image, the following methods are cited.

A pile height (height of a toner image) is calculated such that a depth in the vertical direction is calculated by a displacement sensor and a light-shielding length in the horizontal direction is measured by a linear sensor for parallel beams.

A toner charge amount is calculated by a ratio of a potential of an electrostatic latent image of an all-overlaying portion to an amount of adhesion which is measured by a potential sensor that measures a potential in a developing state of the latent image and which is converted from a reflection concentration sensor at the same position.

A dot fluctuation or a dot gap is calculated by the following method. That is, a dot pattern image is detected on a photosensitive body by an infrared area sensor, the dot pattern is detected by an area sensor having wavelengths depending on colors on an intermediate transfer body, and an appropriate process is performed.

An amount of offset (after fixing) is calculated such that corresponding positions on a sheet of recording paper and a fixing roller by an optical sensor and compared with each other.

An optical sensor is installed after the transfer process (on a PD or on a belt), a remaining amount of transfer is decided by an amount of reflected light from a transfer remaining pattern obtained after a specific pattern is transferred.

Color unevenness in overlapping is detected by a full-color sensor that detects a fixed image on the sheet of recording paper.

(a-7) Characteristic of Formed Toner Image

An image concentration and a color are optically detected (Any one of a reflectance and a transmittance may be used. A projecting wavelength is selected depending on a color). concentration and monochromatic information may be obtained on a photosensitive body or an intermediate transfer body. However, a combination of colors such as color unevenness must be measured on a sheet of paper.

Tone property is calculated such that reflection concentrations of toner images formed on a photosensitive body at tone levels or toner images transferred to a transfer body are detected by an optical sensor.

To calculate sharpness, an image is obtained by developing or transferring a line repeat pattern using a single-eye sensor having a small spot diameter or a line sensor having a high resolution.

To calculate graininess (feeling of roughness), a halftone image is read by the same method as the method of detecting sharpness, to thereby calculate a noise component.

Resist skew is calculated by the following method. Optical sensors are arranged at both the ends in the main scanning direction after resist, and differences between an ON timing of a resist roller and detection timings of both the sensors are calculated.

To calculate color resist, a single-eye small-diameter spot sensor or a high-resolution line sensor detects an edge portion of an overlapping image on an intermediate transfer body or a sheet of recording paper.

Banding (concentration unevenness in a sending direction): a small-diameter spot sensor or a high-concentration spot sensor measures the concentration unevenness in a sub-scanning direction on a sheet of paper, to thereby measure an amount of signal having a specific frequency.

A gloss (unevenness) is set by detecting a sheet of recording paper, on which a uniform image is formed, with a regular reflection optical sensor.

Blushing is calculated by the following method. An optical sensor that detects a relatively large range on a photosensitive body, an intermediate transfer body, or a sheet of recording paper, reads an image background portion. Alternatively, a high-resolution area sensor acquires pieces of image information in respective areas of a background portion, to thereby count the number of toner particles included in the image.

(a-8) Physical Characteristic of Print by Image Forming Apparatus

Stain, blurring, or the like in an image is decided by the following method. An area sensor detects a toner image on a photosensitive body, an intermediate transfer body, or a sheet of recording paper, and the image information acquired is subjected to image processing.

A gap is calculated by the following method. a high-resolution line sensor or the area sensor reads an image on the sheet of recording paper, to thereby calculate an amount of toner dispersed around a pattern portion.

A high-resolution line sensor detects void at a rear end and betakurosu void on the photosensitive body, the intermediate transfer body, or the sheet of recording paper.

A displacement sensor detects curling, waving, and bending. Only to install sensors in positions near both the end portions of the sheet of recording paper is effective to detect bending.

To detect rust or scratches in edge surfaces, when delivered sheets of paper are stocked to some extent, the edge surfaces are photographed or analyzed by an area sensor vertically arranged on a paper delivery tray.

(a-9) Environmental State

For temperature detection, a thermocouple scheme that takes, as a signal, thermal electromotive force generated at a contact point between different metals or a metal and a semiconductor joined to each other, a resistance change, a resistance change element using that the resistivity of a metal or a semiconductor changes depending on a temperature, a pyro-electric element in which an arrangement of charges in a crystal of a certain type is deflected by an increase in temperature to generate a potential on the surface, a thermomagnetic effect element that a change in magnetic characteristic caused by a temperature, or the like can be employed.

For detecting humidity, an optical measuring method that measures optical absorption of $H_2O$ or OH radicals, a humidity sensor that measures a change in electric resistance of a material caused by absorption of steam, or the like is used.

Gases of various types are basically detected by measuring a change in electric resistance of an oxide semiconductor according to absorption of the gases.

In detection of an air-flow (direction, flow rate, and gas type), an optical measuring method or the like is used. However, when it is considered that the device is mounted on the system, an air-bridge flow sensor that can be made more compact is especially useful.

In detection of air pressure and pressure, a method that measures a mechanical displacement of a membrane such as a pressure-sensitive material is used or other methods are used. The method as described above is used in detection of vibration.

(b) About Control Parameter Information

A control unit determines the operation of the image forming apparatus. Therefore, it is effective to use input/output parameters of the control unit directly.

(b-1) Image Forming Parameter

The following are examples of direct parameters that are output by an arithmetic process, performed by the control unit, to form an image.

Set values of a process condition by the control unit, for example, a charging potential, a developing bias value, a fixing temperature set value, and the like Similarly, set values of various image processing parameters for halftone processing, color correction, and the like Various parameters set by the control units for the operation of the apparatus, for example, a timing of paper conveyance, execution time of a preparation mode before image formation, and the like (b-2) User Operation History Frequency of various operations selected by a user such as the number of colors, the number of sheets of paper, and image quality designation A frequency of paper side selected by a user (b-3) Power Consumption Total power consumptions in an entire period or in units of specific periods (one day, one week, one month, or the like) or a distribution of the total power consumption, a change in power consumption (derivative), a cumulative value (integral)

(b-4) Consumption of Consumable Articles

Quantities of toner, photosensitive body, and sheets of paper consumed in an entire period or in units of specific periods (one day, one week, one month, or the like) or a distribution of the consumed quantities, a change in quantity (derivative), and a cumulative value (integral)

(b-5) Failure Occurrence Information

Frequency of failure (in units of types) in an entire period or in units of specific periods (one day, one week, one month, or the like) or a distribution of the frequencies, a change in frequency (derivative), and a cumulative value (integral)

(c) Input Image Information

Based on the image information sent from a host computer as direct data, or image information obtained after an original image is read by a scanner and subjected to image processing, the following pieces of information can be acquired.

Color pixel cumulative quantity is calculated each time image data of RGB signals are counted in units of pixels.

According to a method described in, e.g., Japanese Patent Publication No. 2621879, an original image is separated into characters, dots, a photograph, and a background, so that ratios of a character portion, a halftone portion, and the like can be calculated. Similarly, a ratio of color characters can also be calculated.

Cumulative values of the color pixels are counted in units of regions partitioned in the main scanning direction, so that a distribution of toner consumption in the main scanning direction can be calculated.

An image size can be calculated by an image size signal generated by the control unit, or the distribution of color pixels in the image data.

Types (size and font) of characters can be calculated from attribute data of the characters.

The index value D is calculated on the basis of the various pieces of information. A potential probability of occurrence of an abnormal state, such as a failure, is decided on the basis of the index value, to thereby predict occurrence of an abnormal state such as a failure. Basically, as described above, if the index value D is larger than a predetermined threshold value, it is determined that the probability of occurrence of a failure is high. The threshold value is generally determined by an experiment performed in advance. The initial value of the threshold value may be set at an appropriate value (for example, 10), and the threshold value may be updated with accumulation of data.

The index value D indicates a measure of a deviation, from a normal state, of mutual correlation between pieces of information acquired. If the index value is large, deviation from the normal state is determined as large. Therefore, even though a mechanism of a failure is not known, the probability of occurrence of a failure can be predicted.

After the index value D is calculated, the state of an image forming apparatus is decided on the basis of the index value D to predict occurrence of an abnormal state. A processing method performed thereafter will be described below. After the index value is calculated or the occurrence of an abnormal state is predicted, the following processes (d) to (j) can be performed.

(d) Calculation Result, State Decision Result, and Abnormal State Occurrence Prediction Result are Output The index value D calculated or a numerical value on which the index value is reflected is output, and a result of predicting an occurrence of an abnormal state of the image forming apparatus, such as a warning that lets a user know that a failure is likely to occur, can be output. A temporal change in the index value D, or the numerical value on which the index value D is reflected, may be plotted on a graph and output. The following are examples of output methods.

(d-1) Display of Numerical Data or Message on a Display Unit Such as Liquid Crystal Display in an Operation Unit Panel or the Like (d-2) Announcement and Warning Consisting of Voice or a Sound of a Specific Pattern Generated by a Sound Output Unit Such as Loudspeaker (d-3) Recording on Recording Medium (Transfer Paper)

The result of the process (d) is output to a display unit or a sound output unit arranged in the corresponding image forming apparatus or recorded on a recording medium (transfer paper) and output. Additionally, the result may be transferred to a monitoring center that is connected by a communication network, to monitor the states of the devices.

(e) Calculation Result, State Decision Result, and Abnormal State Occurrence Prediction Result are Transferred The same contents as those in (d) are transferred to a printer server or the monitoring center.

(f) Calculation Result, State Decision Result, and Abnormal State Occurrence Prediction Result are Stored The same contents as those in (d) are stored in storage devices (memories) arranged inside image forming apparatuses, a printer server, and an apparatus of the monitor center. Furthermore, the contents stored in the storage devices are read to make it possible to perform control.

(g) The Apparatus is Stopped

If the index value D calculated exceeds a predetermined reference value or a rate of increase of the calculated index value D increases, the image forming apparatus is prevented from being operated in abnormal conditions and maintenance is requested.

(h) Restriction and Control of Operation are Changed

A related portion is estimated on the basis of both the calculation result of the index value D and information sources. Control changes are performed such that an operation related to the portion is restricted. The following are examples of the control changes.

(h-1) Change of Color Mode
(h-2) Change of Recording Speed
(h-3) Change of the Number of Halftone Lines
(h-4) Change of Halftone Processing Method
(h-5) Restriction of Paper Type
(h-6) Change in Parameter of Resist Control
(h-7) Change in Parameter of Image Forming Process (for Example, in an Image Forming Apparatus Using an Electronic Photographing Scheme, Charging Potential, an Amount of Exposure, a Developing Bias, a Transfer Bias, and the Like)

(i) Supply and Exchange of Consumable Article and Component

Supply and exchange are performed automatically by the calculation result of the index value D.

j) Automatic Repair

When an abnormal state of a specific portion is found on the basis of both the index value D and the information sources, a mode to repair the target portion is executed.

Examples that describe a method of acquiring concrete pieces of information in the image forming apparatus according to the embodiment will be described below. Types of pieces of information used to decide the state of the image forming apparatus and a method of acquiring the pieces of information are not limited to the following pieces of information and the following method. Pieces of information of various types and features, and other methods of acquiring these pieces of information can be employed.

In a first example, index values or a common index value is calculated, before a product is shipped, using the image forming apparatus shown in FIGS. 6 to 8. After the shipment, the index value is monitored in an on-line manner. Maintenance is performed when the index value increases. Concrete contents of the types of pieces of information to be acquired and a method of acquiring the pieces of information will be described below.

(1) Temperature

In this example, a unit using a resistance change element that has the simplest principle and structure, and that can be microminiaturized was employed as an information acquiring unit to acquire temperature information.

Figure 9:
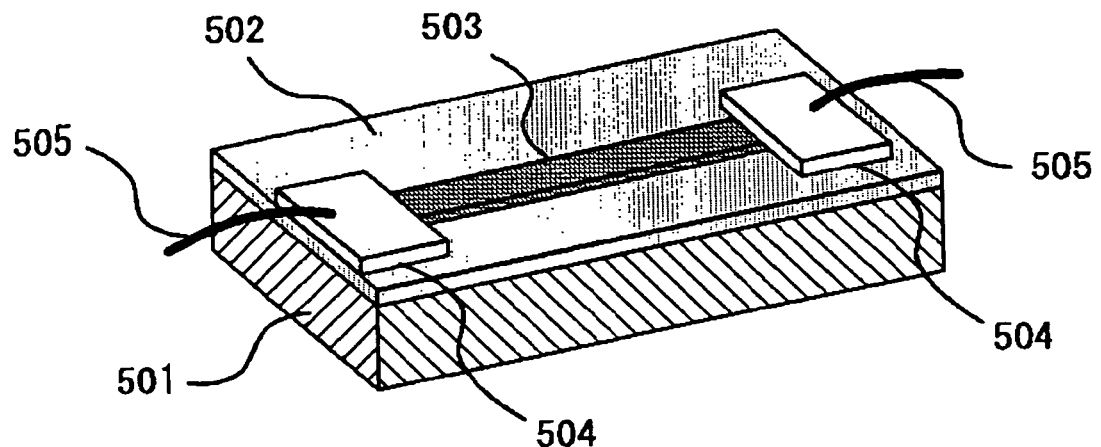
FIG. 9 is a perspective view of a resistance-varying element of a thin film type.

FIG. 9 is a perspective view of a resistance-varying element of a thin-film type used in this example. The resistance change element can be manufactured as follows. An insulating film 502 is formed on a substrate 501, and a thin film sensing unit 503 consisting of a metal or a semiconductor material is formed on the insulating film 502. Furthermore, pad electrodes 504 are formed at both the ends of the sensing unit 503, and lead lines 505 are connected. In the resistance change element, the electric resistance of the sensing unit 503 changes with a change in surrounding temperature, and hence, the change may be picked out as a change in voltage or current. Moreover, the sensing unit 503 includes a thin film, and therefore, the entire element can be made compact and can be incorporated in the system.

Figure 10:
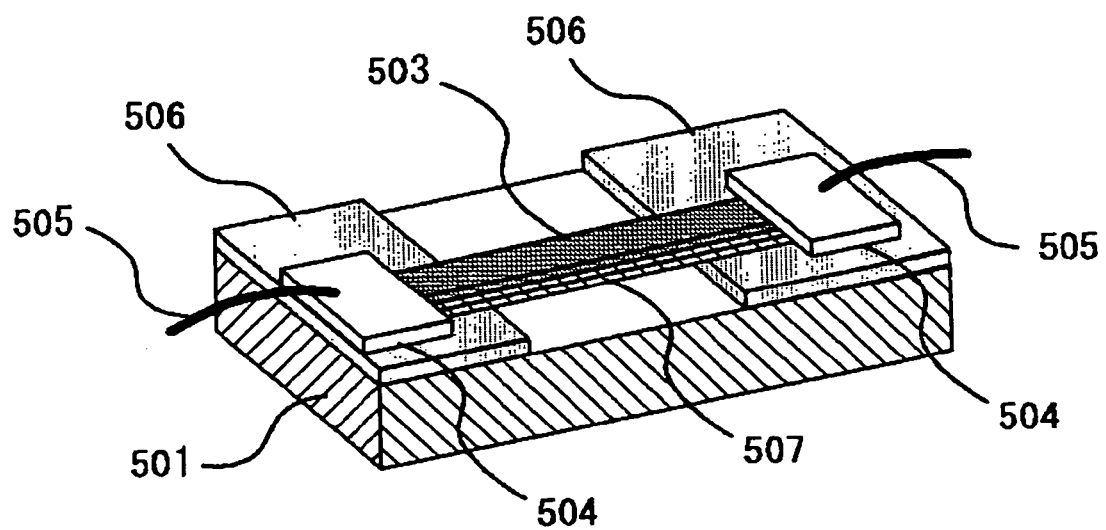
FIG. 10 is a perspective view of another resistance-varying element.

FIG. 10 is a perspective view of another resistance change element used in the example. The resistance change element in FIG. 10 is different from that in FIG. 9 in that the sensing unit 503 is arranged on a thin film bridge 507 floated from the substrate 501 through spacers 506. This structure prevents heat from being scattered and lost from the sensing unit 503, and the sensing unit 503 has good response to temperature. This structure can detect only radiant heat from a portion to be measured, and is preferably used in non-contact measurement.

(2) Humidity

A humidity sensor that can be made compact is useful. The following basic principle is used. When humidity-sensitive ceramics adsorbs steam, ion conductivity is increased by adsorbed water to decrease the electric resistance of the ceramics. The material of the humidity-sensitive ceramics may be a porous material consisting of alumina, apatite, or $ZrO_2$—MgO.

Figure 11:
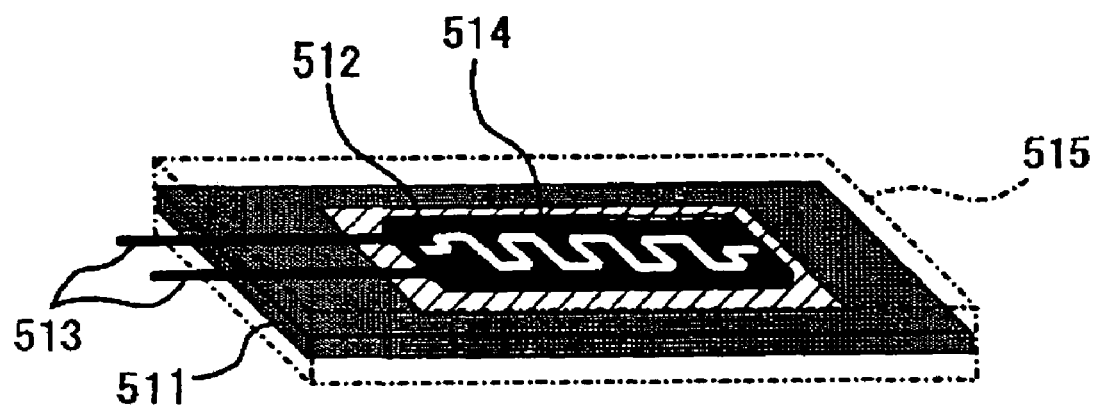
FIG. 11 is a perspective view of a humidity sensor.

FIG. 11 is a perspective view of the humidity sensor used in the embodiment. A comb-shaped electrode 512 is arranged on an insulating substrate 511, and terminals 513 are connected to both the ends of the comb-shaped electrode 512. In addition, the humidity-sensitive layer 514 (generally, humidity-sensitive ceramics) is formed, and the entire area is covered with a case 515. When the humidity-sensitive ceramics adsorbs steam through the case 515, the electric resistance decreases. Therefore, the decrease in electric resistance is measured as a change in voltage or current.

(3) Vibration

A vibration sensor is basically the same as a sensor that measures air pressure and pressure. When the vibration sensor is mounted on the system, a sensor using silicon, which can be microminiaturized, is especially useful. The motion of a vibrator on a diaphragm consisting of thin silicon can be measured by measuring a change in capacitance between the vibrator and a counter electrode arranged opposite to the vibrator or by using a piezoresistance effect of the Si diaphragm itself.

Figure 12:
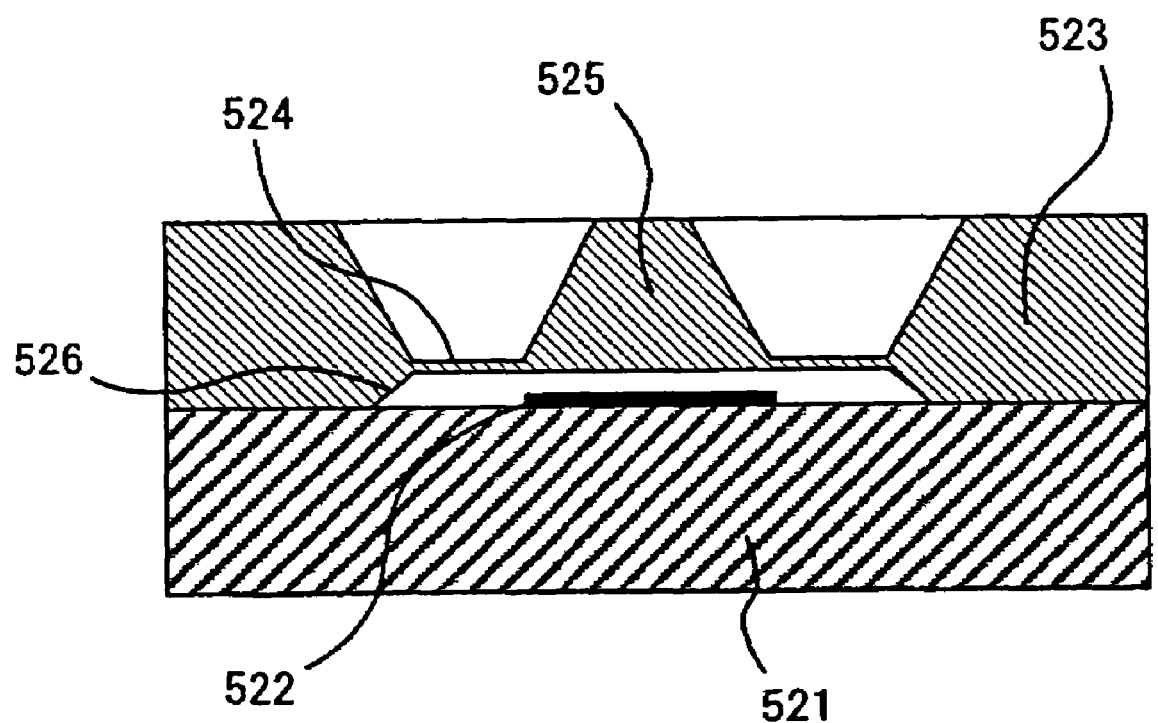
FIG. 12 is a sectional view of a vibration sensor.

FIG. 12 is a sectional view of a vibration sensor used in the embodiment. A counter electrode 522 is arranged on an insulating substrate 521. A thin diaphragm 524 and a vibrator 525 are formed on a silicon substrate 523, and a step 526 is formed between the vibrator 525 and the counter electrode 522. The resultant structure is joined to the insulating substrate 521 having the counter electrode 522 manufactured in advance. The vibrator 525 vibrates according to the vibration or pressure that acts from the surroundings. The vibration may be measured as a change in capacitance between the vibrator 525 and the counter electrode 522.

(4) Toner Concentration

A toner concentration for each color is detected. A sensor using a conventionally known scheme can be used as a toner concentration sensor. For example, Japanese Unexamined Patent Publication No. 6-289717 discloses a sensing system, for measuring the toner concentration, that measures a change in permeability of the developing agent in a developing device.

Figure 13:
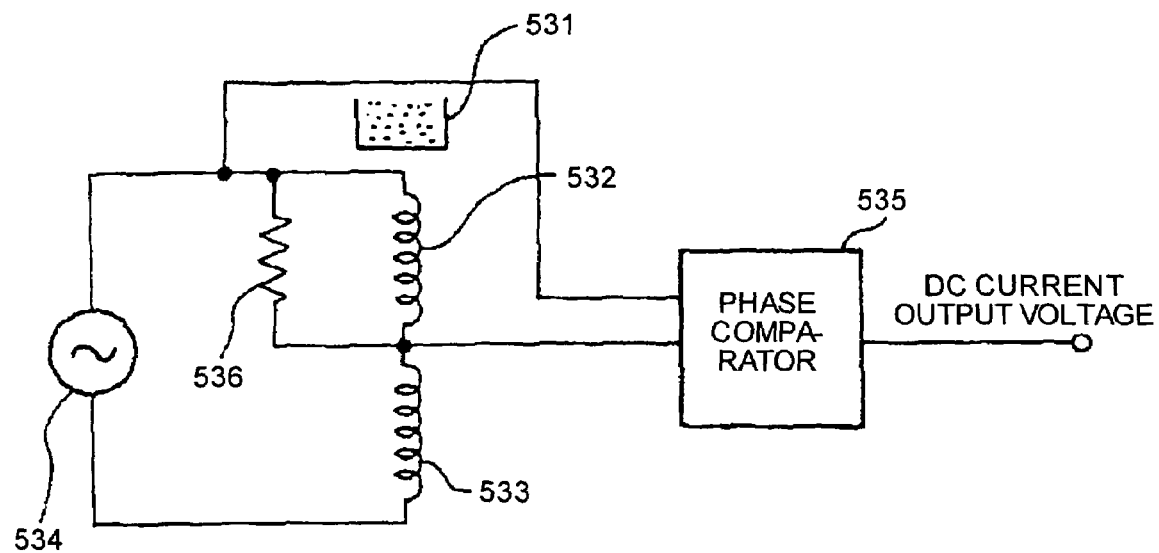
FIG. 13 illustrates a circuit configuration of a toner concentration detecting unit.

FIG. 13 illustrates a circuit configuration of a toner concentration detecting unit. A reference coil 533 is differentially connected to a detection coil 532 arranged near a developing agent 531 obtained by mixing a magnetic carrier and non-magnetic toner with each other. The inductance of the detection coil 532 varies with a change in permeability caused by an increase/decrease in toner concentration (directly, the magnetic carrier). However, the inductance of the reference coil 533 is not influenced by the change in toner concentration. An AC drive source 534 that is oscillator driven at a frequency of 500 kHz is connected to the series circuit of the two coils 532 and 533 to drive both the coils 532 and 533. A differential output is picked from the connection point between both the coils 532 and 533. The output is connected to a phase comparator 535, and one of the outputs from the AC drive source 534 is independently connected to the phase comparator 535, so that the phases of the voltage and the differential output voltage from the AC drive source 534 are compared with each other.

A sensitivity setting resistor 536 (R1) is connected in parallel to at least one of the two coils, i.e., the detection coil 532 and the reference coil 533. In FIG. 13, the sensitivity setting resistor 536 (R1) is connected to the detection coil 532. The sensitivity characteristics are controlled by decreasing the sensitivity to a change in toner concentration. FIG. 14 is an assembly diagram of the coils in the toner concentration detecting unit. Both the coils 532 and 533 are wound on a cylindrical coil support member 537 such that the coils 532 and 533 are vertically adjacent to each other in FIG. 14. The detection coil 532 is located on the near side of the developing agent 531 to detect a change in permeability, and the reference coil 533 is located on the far side of the developing agent 531 to prevent the permeability from changing even if the toner concentration changes.

(5) Charging Potential

A charging potential is detected for each color.

Figure 15:
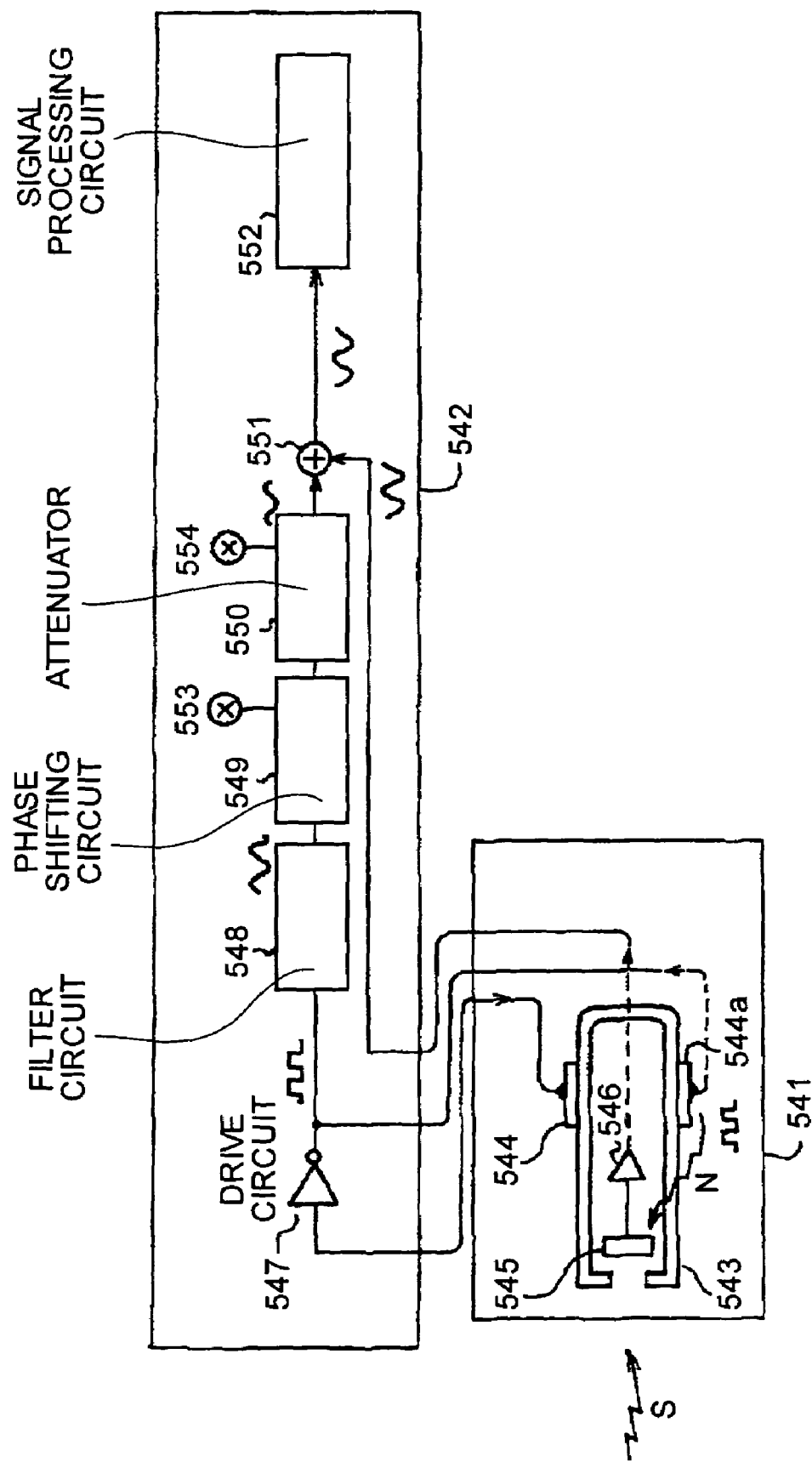
FIG. 15 illustrates a circuit configuration of a potential measuring system that detects a charging potential.

FIG. 15 illustrates a circuit configuration of a potential measuring system that detects a charging potential used in the example. In FIG. 15, a sensor unit substrate 541 is fixed in opposition to an object (not shown). A signal processing unit substrate 542 sends a drive signal to the sensor unit substrate 541 and receives a sensor output. The sensor unit substrate 541 includes a tuning fork 543 serving as a chopping unit, and a piezoelectric element 544. The piezoelectric element 544 is driven by a drive signal from the sensor unit substrate 542. In the potential measuring system, a self-excitation oscillation scheme using the following loop is used. When one piezoelectric element 544 is driven, vibration generated by the piezoelectric element 544 is transmitted to another piezoelectric element 544a through the tuning fork 543, and the vibration is returned to the drive source. A measurement electrode 545 (hereinafter, "an electrode") receives an electric flux line from the object. An amplifier 546 amplifies a temporal change of an electric flux line S received by the measurement electrode 545. The sensor unit substrate 542 includes a piezoelectric element drive circuit 547, a filter circuit 548, and a phase shifting circuit 549. The filter circuit 548 shapes a waveform. The phase shifting circuit 549 shifts a phase difference between a drive signal mixed in the sensor and an actual drive signal by 180° to cancel the drive signals. The phase difference between the two signals generally changes depending on a mixing path. An attenuator 550 controls the size of a correction signal, the phase of which is controlled. An adding circuit 551 adds the correction signal to the sensor output. A signal processing circuit 552 processes a final signal output to calculate a potential of an object. Reference numerals 553 and 554 denote control volumes of the phase shifting circuit and the attenuator, respectively.

With such configuration, an amount of phase shift and an attenuator gain are controlled to achieve optimization, so that a signal having an opposite phase and an equal level can be added as the correction signal to a mixing signal based on the drive signals, and only a sensor output based on a true object can be actually detected. A control unit enables to correspond to a change in characteristics with aging by a control operation, and the reliability of the sensor improves.

(6) LD Drive Current

Drive current values of an LD (semiconductor laser) that performs image exposure are monitored for different colors on a drive circuit, and are used.

(7) Total Counter (the Numbers of Cumulative Print Screens for Different Colors)

Cumulative data, obtained by counting print screens for different colors, is used. For example, when one image is formed in a full color mode, each of the numbers of Y, M C, and Bk print screens is incremented by one. When one image is formed in a monochromatic (black) mode, only the number of Bk print screens is incremented by one. In the Y and M modes, the numbers of Y and M print screens are incremented by one each. These data are stored in a storage element, and the result is used.

(8) Developing γ-Value

Gradual latent image potentials are formed on a photosensitive body in a test mode, and the latent image is developed under a specific condition to form a gradual concentration pattern. A reflective concentration sensor reads the concentration pattern, and a relationship between a potential (potential difference) and the developed reflective concentration is calculated. The inclination of the relationship is set as a γ-value. This value is calculated for each color, and is used.

(9) Developing Start Voltage

Similar to the above configuration, a potential and a developed reflective concentration are calculated in a test mode, and a potential at which developing is zero is calculated by extrapolation. The potential is set as a developing start potential. This value is calculated for each color and used.

(10) Ratio of Colored Area

From input image information, a ratio of colored area is calculated for each color on the basis of a ratio of a cumulative value of pixels to be colored and a cumulative value of all the pixels. The ratios of colored areas are used.

In the example, a test (described below) is performed. A printer test model is prepared, and a running test for various pseudo application modes is performed in an experimental laboratory. At this time, data of 30 types classified into 10 items are collected several times a day. Some of the collected data are shown in Table 3.

TABLE 3

| Developing γ-value | | | | Developing start voltage | | | | Toner concentration | | | | Charging potential | | | | LD drive current | | | |
| --- | --- | --- | --- | --- | --- | --- | --- | --- | --- | --- | --- | --- | --- | --- | --- | --- | --- | --- | --- |
| Bk | Y | M | C | Bk | Y | M | C | Bk | Y | M | C | Bk | Y | M | C | Bk | Y | M | C |
| 1.39 | 1.41 | 1.63 | 1.58 | −7 | −19 | −17 | −9 | 3.21 | 2.75 | 2.98 | 2.84 | 620 | 600 | 580 | 580 | 656 | 660 | 664 | 664 |
| 2.06 | 1.09 | 1.29 | 1.26 | 3 | −33 | −22 | −23 | 3.31 | 2.28 | 2.48 | 2.58 | 580 | 700 | 640 | 640 | 664 | 640 | 652 | 652 |

TABLE 3-continued

| | | | | | | | | | | | | | | | | | | |
|---|---|---|---|---|---|---|---|---|---|---|---|---|---|---|---|---|---|---|
| 1.42 | 1.72 | 1.79 | 1.23 | −11 | −7 | 1 | −20 | 3.38 | 2.10 | 2.47 | 2.63 | 620 | 580 | 580 | 660 | 656 | 664 | 664 | 648 |
| 1.40 | 1.49 | 1.08 | 1.39 | −28 | 20 | 31 | 17 | 3.50 | 2.25 | 2.68 | 2.57 | 600 | 580 | 700 | 620 | 660 | 664 | 640 | 656 |
| 1.08 | 1.14 | 1.08 | 1.18 | −11 | −27 | −29 | −25 | 3.34 | 2.13 | 2.45 | 2.40 | 720 | 680 | 700 | 660 | 636 | 644 | 640 | 648 |
| 1.35 | 1.25 | 1.27 | 1.25 | −17 | −31 | −26 | −25 | 3.21 | 2.01 | 2.37 | 2.37 | 640 | 640 | 640 | 640 | 652 | 652 | 652 | 652 |
| 1.37 | 1.48 | 1.40 | 1.31 | 17 | 18 | 18 | 21 | 3.19 | 2.27 | 2.73 | 2.78 | 620 | 600 | 600 | 640 | 656 | 660 | 660 | 652 |
| 1.05 | 1.00 | 1.07 | 1.17 | −18 | −30 | −39 | −33 | 3.23 | 2.39 | 2.35 | 2.42 | 660 | 740 | 660 | 660 | 648 | 632 | 648 | 648 |
| 1.24 | 1.33 | 1.48 | 1.85 | −12 | −24 | −20 | −6 | 2.97 | 2.13 | 2.37 | 2.28 | 660 | 700 | 580 | 620 | 648 | 640 | 684 | 656 |
| 1.41 | 1.36 | 1.27 | 1.49 | −16 | −22 | −23 | −11 | 3.29 | 2.08 | 2.35 | 2.31 | 620 | 620 | 640 | 600 | 656 | 656 | 652 | 660 |
| 1.37 | 1.14 | 1.28 | 1.41 | −27 | −29 | −23 | −14 | 3.00 | 2.15 | 2.47 | 2.43 | 600 | 680 | 640 | 620 | 660 | 644 | 652 | 656 |
| 1.72 | 1.34 | 1.32 | 1.17 | −2 | −20 | −14 | −29 | 3.69 | 2.32 | 2.61 | 2.63 | 580 | 620 | 640 | 680 | 664 | 656 | 652 | 648 |
| 1.49 | 1.11 | 1.13 | 1.19 | −13 | −25 | −23 | −24 | 3.46 | 2.50 | 2.65 | 2.61 | 600 | 700 | 680 | 660 | 660 | 640 | 644 | 648 |
| ... | ... | ... | ... | ... | ... | ... | ... | ... | ... | ... | ... | ... | ... | ... | ... | ... | ... | ... | ... |

| Environment | | Ratio of colored area | | | | Vibration | | | |
|---|---|---|---|---|---|---|---|---|---|
| Temperature | Humidity | Bk | Y | M | C | Bk | Y | M | C |
| 27.9 | 40 | 4.55 | 6.87 | 7.73 | 4.94 | 4.89 | 5.65 | 3.12 | 4.20 |
| 27.0 | 29 | 37.4 | 1.97 | 1.58 | 1.52 | 4.51 | 5.03 | 3.16 | 4.00 |
| 26.6 | 41 | 3.73 | 1.97 | 1.56 | 1.54 | 4.26 | 4.91 | 3.06 | 3.79 |
| 26.6 | 30 | 3.72 | 1.97 | 1.56 | 1.57 | 4.87 | 4.88 | 3.29 | 3.93 |
| 26.3 | 26 | 3.72 | 1.97 | 1.56 | 1.58 | 4.39 | 5.44 | 3.06 | 4.29 |
| 26.0 | 25 | 3.72 | 1.98 | 1.55 | 1.58 | 4.61 | 5.28 | 9.65 | 11.49 |
| 26.1 | 33 | 3.72 | 2.02 | 1.58 | 1.59 | 4.94 | 5.63 | 7.95 | 7.08 |
| 26.6 | 24 | 3.74 | 2.04 | 1.57 | 1.64 | 4.36 | 4.99 | 7.94 | 7.09 |
| 26.9 | 27 | 3.73 | 2.05 | 1.57 | 1.65 | 4.28 | 4.96 | 7.81 | 7.37 |
| 26.9 | 30 | 3.73 | 2.04 | 1.56 | 1.65 | 4.75 | 5.06 | 6.73 | 7.51 |
| 26.6 | 24 | 3.73 | 2.03 | 1.55 | 1.65 | 4.22 | 6.37 | 5.12 | 7.59 |
| 25.3 | 39 | 3.72 | 2.03 | 1.56 | 1.65 | 4.47 | 5.40 | 7.40 | 7.23 |
| 26.6 | 30 | 3.71 | 2.01 | 1.54 | 1.64 | 4.44 | 5.10 | 6.88 | 6.22 |
| ... | ... | ... | ... | ... | ... | ... | ... | ... | ... |

Actually, 50 combinations of data were collected. However, meanwhile, the apparatus operated without specific problems. On the basis of the data, calculations using the numerical expressions (1) to (5) were performed to obtain calculation parameters required in the calculation expression (6). Using the result, the average of the 50 combinations of values D in a normal operation is about 1. In this manner, a calculation method (calculation expression) for the index value D was defined.

Products based on the test model were put on sale, and continuously monitored in the market. Data to be acquired are the same as that in the test.

Figure 16:
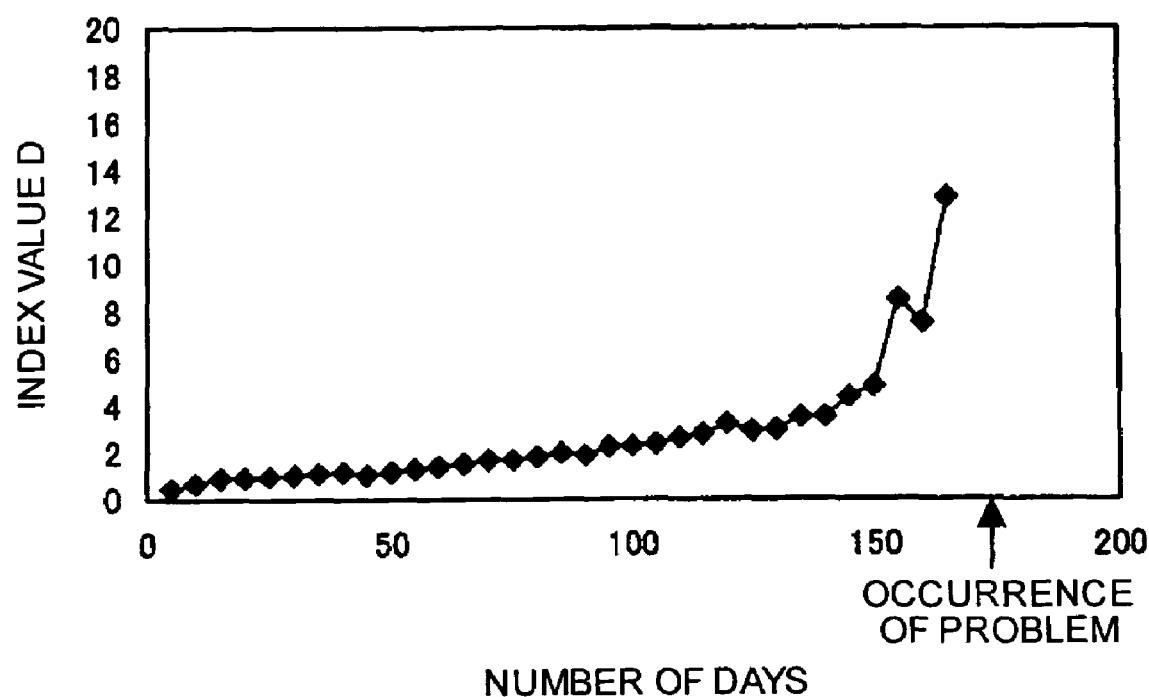
FIG. 16 is a graph of temporal change in an index value D calculated in a first example.

FIG. 16 is a graph of a temporal change in the index value D calculated in the embodiment. In FIG. 16, an arrow indicates a timing at which a problem (abnormal state) occurs in the image forming apparatus. The problem occurring in this example was toner filming on a photosensitive drum. Prior to the occurrence of the abnormal state, the index value D increases. Based on the result, an increase in the index value D and the occurrence of an abnormal state strongly correlate with each other. By tracking the temporal change in the index value D, the occurrence of the problem (toner filming) is predicted in advance. More specifically, based on the value when the index value D increases, a change of the subsequent state of the printer is decided. Thus, a period of time taken until the index value D becomes a value at which the problem (toner filming) occurs can be understood. Therefore, whether the problem (toner filming) will occur and also the time at which the problem (toner filming) will occur can be predicted.

In the example, the image forming apparatus is connected to a monitoring system through a communication network, and the index value D is always transmitted to the monitoring system. The monitoring system monitors a change in the index value D, and is designed to generate a warning signal when the index value D tends to increase and then exceeds a specific value. A state in which the warning signal is generated is regarded as a state in which the apparatus has a potential failure, and a service person is dispatched to execute maintenance. The service person directly checks the state of the image forming apparatus, performs necessary processes such as a change of components, and electrical and mechanical control. After the processes, the service person confirms that the index value D falls within a normal range, and then ends the maintenance. The index value D or a comment corresponding to the index value D is always displayed to let a user know the state of the image forming apparatus. Thus, the user can have a service person attend to the image forming apparatus for advance maintenance.

In a second example, after products are shipped, data are collected in the market by using 10 printers as field test machines. Measured items are the same as those in the first example. One data is collected everyday. Data collected for 5 days in a row were employed. Use conditions and environments are different from each other in different printers. However, all the printers normally operate during days for which the data are collected.

Table 4 contains information acquired in the example. Using these data, calculation parameters of an index value D are determined by the same method as in the first example. Thereafter, data of the same items are acquired from a plurality of printers (having the same specifications as those in the field test machine) except for the field test machines, and index values D are sequentially calculated.

TABLE 4

| Apparatus number | Data number | Developing γ-value | | | | Developing start voltage | | | | Toner concentration | | | | Charging potential | | | |
|---|---|---|---|---|---|---|---|---|---|---|---|---|---|---|---|---|---|
| | | Bk | Y | M | C | Bk | Y | M | C | Bk | Y | M | C | Bk | Y | M | C |
| 1 | 1 | 1.43 | 1.27 | 0.94 | 1.26 | −12 | −33 | −33 | −22 | 3.80 | 2.96 | 2.88 | 2.38 | 800 | 640 | 740 | 640 |
| | 2 | 1.43 | 1.27 | 0.94 | 1.26 | −12 | −33 | −33 | −22 | 3.89 | 2.90 | 3.13 | 2.36 | 600 | 640 | 740 | 640 |
| | 3 | 1.39 | 1.15 | 1.14 | 1.27 | −18 | −46 | −33 | −23 | 3.56 | 2.85 | 2.86 | 2.26 | 620 | 660 | 680 | 840 |
| | ... | ... | ... | ... | ... | ... | ... | ... | ... | ... | ... | ... | ... | ... | ... | ... | ... |
| 2 | 1 | 1.43 | 1.86 | 2.13 | 1.32 | −15 | −21 | −1 | −27 | 4.09 | 3.20 | 3.30 | 2.81 | 600 | 780 | 880 | 840 |
| | 2 | 1.31 | 1.17 | 1.13 | 1.08 | −8 | −25 | −27 | −32 | 4.04 | 2.91 | 2.84 | 2.22 | 640 | 680 | 680 | 700 |
| | 3 | 1.41 | 1.18 | 1.65 | 1.51 | −24 | −35 | −15 | −16 | 4.08 | 3.04 | 2.87 | 2.25 | 600 | 660 | 580 | 580 |
| | 4 | 1.24 | 0.98 | 0.92 | 1.05 | −15 | −47 | −38 | −41 | 3.95 | 2.93 | 2.82 | 2.13 | 640 | 700 | 720 | 660 |
| | ... | ... | ... | ... | ... | ... | ... | ... | ... | ... | ... | ... | ... | ... | ... | ... | ... |
| 3 | 1 | 1.36 | 1.20 | 0.95 | 1.01 | −28 | −42 | −44 | −40 | 3.79 | 3.06 | 3.21 | 2.26 | 600 | 640 | 720 | 680 |
| | 2 | 1.69 | 1.07 | 1.04 | 1.17 | −13 | −42 | −37 | −38 | 3.89 | 2.94 | 3.03 | 2.32 | 580 | 700 | 720 | 660 |
| | 3 | 1.44 | 0.90 | 1.04 | 1.29 | −17 | −57 | −37 | −22 | 4.05 | 2.88 | 2.94 | 2.43 | 600 | 720 | 720 | 640 |
| | 4 | 1.13 | 1.29 | 1.11 | 0.94 | −18 | −34 | −31 | −50 | 3.99 | 3.13 | 3.30 | 2.68 | 620 | 620 | 680 | 700 |

| Apparatus number | Data number | LD drive current | | | | Environment | | Ratio of colored area | | | | Vibration | | | |
|---|---|---|---|---|---|---|---|---|---|---|---|---|---|---|---|
| | | Bk | Y | M | C | Temperature | Humidity | Bk | Y | M | C | Bk | Y | M | C |
| 1 | 1 | 660 | 652 | 632 | 652 | 24.0 | 24 | 3.90 | 1.98 | 1.76 | 1.93 | 4.88 | ... | | |
| | 2 | 660 | 852 | 832 | 852 | 24.2 | 25 | 3.91 | 1.98 | 1.76 | 1.94 | 4.54 | ... | | |
| | 3 | 656 | 648 | 644 | 652 | 24.8 | 24 | 3.92 | 1.98 | 1.77 | 1.94 | 4.75 | ... | | |
| | ... | ... | ... | ... | ... | ... | ... | ... | ... | ... | ... | ... | ... | | |
| 2 | 1 | 660 | 624 | 844 | 652 | 25.7 | 26 | 3.93 | 2.02 | 1.81 | 1.97 | 4.29 | ... | | |
| | 2 | 652 | 644 | 644 | 640 | 25.5 | 29 | 4.00 | 2.10 | 1.89 | 2.04 | 5.02 | ... | | |
| | 3 | 880 | 648 | 664 | 664 | 26.1 | 27 | 3.99 | 2.09 | 1.89 | 2.04 | 4.85 | ... | | |
| | 4 | 652 | 640 | 636 | 648 | 26.4 | 21 | 3.99 | 2.08 | 1.87 | 2.03 | 5.23 | ... | | |
| | ... | ... | ... | ... | ... | ... | ... | ... | ... | ... | ... | ... | ... | | |
| 3 | 1 | 660 | 652 | 636 | 644 | 25.9 | 22 | 3.98 | 2.07 | 1.88 | 2.02 | 4.50 | ... | | |
| | 2 | 664 | 640 | 636 | 648 | 24.7 | 24 | 3.97 | 2.08 | 1.85 | 2.01 | 5.30 | ... | | |
| | 3 | 660 | 636 | 636 | 652 | 25.1 | 24 | 3.97 | 2.07 | 1.84 | 2.01 | 5.34 | ... | | |
| | 4 | 656 | 656 | 648 | 640 | 26.0 | 23 | 3.96 | 2.06 | 1.84 | 2.00 | #### | ... | | |

Figure 17:
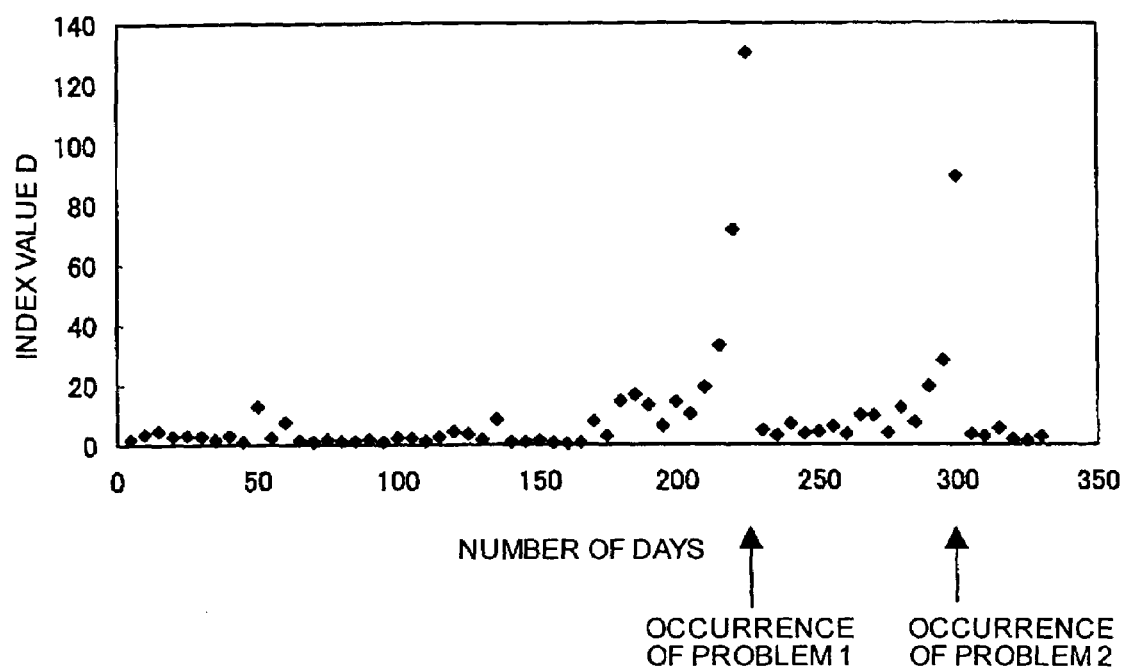
FIG. 17 is a graph of transition (temporal change) of an index value D calculated in a second example.

FIG. 17 is a graph of transition (temporal change) of an index value D calculated in the second example and related to one specific printer. In FIG. 17, an arrow indicates a timing at which a problem (abnormal state) occurs in an image forming apparatus. In FIG. 17, problem 1 is toner filming to a photosensitive body, and problem 2 is rust in the apparatus caused by toner scattering. In the graph of FIG. 17, the index value D tends to increase before the problem (abnormal state) actually occurs. In this manner, even though an index value is actually applied to a product of the same type that is not the field test machine used in determination of a calculation method for the index value D, occurrence of a problem can be predicted by the transition (temporal change) of the index value, and a countermeasure can be devised.

On the basis of a temporal change when the index value D increases, a change of the subsequent state of the printer is decided, a period of time taken until the index value D becomes a value at which the problem (toner filming) occurs can be understood. Therefore, whether the problem (toner filming) will occur and the time at which the problem (toner filming) will occur can be predicted.

In a third example, after products are shipped, the same items as in the first example are acquired for each printer in the market. Data having the configuration described in Table 5 was obtained with respect to one specific printer. Using the data, calculation methods of respective index values D are determined based on the data of the printer that operates normally. More specifically, the resultant values are index values D unique to the printer. Thereafter, the index value D is calculated by the method determined as described above while acquiring the data of the same items.

TABLE 5

| Developing γ-value | | | | Developing start voltage | | | | Toner concentration | | | | Charging potential | | | | LD drive current | | | |
|---|---|---|---|---|---|---|---|---|---|---|---|---|---|---|---|---|---|---|---|
| Bk | Y | M | C | Bk | Y | M | C | Bk | Y | M | C | Bk | Y | M | C | Bk | Y | M | C |
| 1.69 | 0.93 | 1.71 | 1.57 | −5 | −50 | −13 | −25 | 4.03 | 3.55 | 3.39 | 2.49 | 580 | 700 | 600 | 600 | 664 | 640 | 660 | 660 |
| 1.38 | 1.34 | 1.05 | 1.07 | −16 | −30 | −37 | −30 | 4.08 | 3.44 | 3.45 | 2.38 | 620 | 660 | 700 | 700 | 656 | 648 | 640 | 640 |

TABLE 5-continued

| | | | | | | | | | | | | | | | | | | | |
|---|---|---|---|---|---|---|---|---|---|---|---|---|---|---|---|---|---|---|---|
| 1.45 | 1.16 | 0.97 | 1.27 | −19 | −47 | −45 | −29 | 4.22 | 3.20 | 3.26 | 2.31 | 600 | 680 | 740 | 640 | 660 | 644 | 632 | 652 |
| 1.40 | 1.07 | 0.92 | 1.11 | −21 | −56 | −51 | −35 | 4.51 | 3.00 | 3.48 | 2.38 | 600 | 680 | 680 | 680 | 660 | 644 | 644 | 644 |
| 1.35 | 0.91 | 0.93 | 1.12 | −22 | −59 | −44 | −33 | 4.01 | 3.26 | 3.50 | 2.45 | 620 | 720 | 680 | 680 | 656 | 636 | 644 | 644 |
| 2.14 | 1.91 | 1.18 | 1.80 | −2 | −25 | −34 | −18 | 3.96 | 3.17 | 3.56 | 2.38 | 620 | 720 | 660 | 680 | 656 | 636 | 648 | 644 |
| 1.74 | 1.14 | 1.19 | 0.68 | −9 | −40 | −26 | −65 | 4.38 | 3.26 | 3.63 | 3.01 | 580 | 660 | 660 | 800 | 664 | 648 | 648 | 620 |
| 1.47 | 1.01 | 1.18 | 0.87 | −12 | −38 | −30 | −46 | 3.86 | 3.25 | 3.56 | 2.69 | 600 | 700 | 700 | 720 | 660 | 640 | 640 | 636 |
| 1.66 | 1.51 | 1.13 | 1.09 | −10 | −18 | −40 | −36 | 3.64 | 3.12 | 3.72 | 2.41 | 580 | 620 | 680 | 700 | 664 | 656 | 644 | 640 |
| 1.32 | 1.28 | 1.17 | 1.06 | −16 | −21 | −28 | −40 | 3.96 | 3.01 | 3.62 | 2.31 | 640 | 640 | 680 | 700 | 652 | 652 | 648 | 640 |
| 1.44 | 1.15 | 0.93 | 1.16 | −12 | −43 | −49 | −34 | 4.17 | 3.11 | 3.54 | 2.46 | 600 | 660 | 700 | 660 | 660 | 648 | 640 | 648 |
| 1.21 | 1.22 | 1.04 | 1.21 | −17 | −42 | −40 | −32 | 3.87 | 2.88 | 3.29 | 2.16 | 660 | 640 | 700 | 680 | 648 | 652 | 640 | 648 |
| 1.33 | 1.22 | 0.80 | 1.05 | −19 | −36 | −80 | −36 | 3.66 | 2.73 | 3.32 | 2.08 | 620 | 640 | 700 | 720 | 656 | 652 | 640 | 636 |
| . | . | . | . | . | . | . | . | . | . | . | . | . | . | . | . | . | . | . | . |
| . | . | . | . | . | . | . | . | . | . | . | . | . | . | . | . | . | . | . | . |
| . | . | . | . | . | . | . | . | . | . | . | . | . | . | . | . | . | . | . | . |

| Environment | | Ratio of colored area | | | | Vibration | | | |
|---|---|---|---|---|---|---|---|---|---|
| Temperature | Humidity | Bk | Y | M | C | Bk | Y | M | C |
| 24.7 | 26 | 3.94 | 2.06 | 1.82 | 1.97 | 4.54 | 5.95 | 5.16 | 6.18 |
| 25.2 | 25 | 3.95 | 2.08 | 1.83 | 1.98 | 4.85 | 5.68 | 5.40 | 5.23 |
| 25.7 | 24 | 3.94 | 2.07 | 1.82 | 1.97 | 4.85 | 4.00 | 6.87 | 5.80 |
| 24.9 | 28 | 3.93 | 2.07 | 1.82 | 1.96 | 6.11 | 5.08 | 5.36 | 6.10 |
| 25.4 | 23 | 3.93 | 2.07 | 1.82 | 1.96 | 5.02 | 5.02 | 6.16 | 6.25 |
| 24.1 | 31 | 3.92 | 2.07 | 1,81 | 1.96 | 5.53 | 5.07 | 5.86 | 6.67 |
| 25.2 | 26 | 3.93 | 2.07 | 1.81 | 1.96 | 5.23 | 5.35 | 5.92 | 6.95 |
| 26.0 | 25 | 3.92 | 2.06 | 1.80 | 1.95 | 4.24 | 4.92 | 6.93 | 6.83 |
| 25.5 | 22 | 3.92 | 2.05 | 1.80 | 1.94 | 4.60 | 4.09 | 7.04 | 6.18 |
| 25.8 | 21 | 3.92 | 2.05 | 1.79 | 1.94 | 5.30 | 5.31 | 5.06 | 6.01 |
| 26.2 | 31 | 3.91 | 2.05 | 1.79 | 1.94 | 5.34 | 4.73 | 5.45 | 5.43 |
| 28.1 | 21 | 3.90 | 2.04 | 1.79 | 1.94 | 11.86 | 4.80 | 6.21 | 6.48 |
| 25.7 | 21 | 3.89 | 2.03 | 1.77 | 1.93 | 6.48 | 4.87 | 6.62 | 7.38 |
| . | . | . | . | . | . | . | . | . | . |
| . | . | . | . | . | . | . | . | . | . |
| . | . | . | . | . | . | . | . | . | . |

Figure 18:
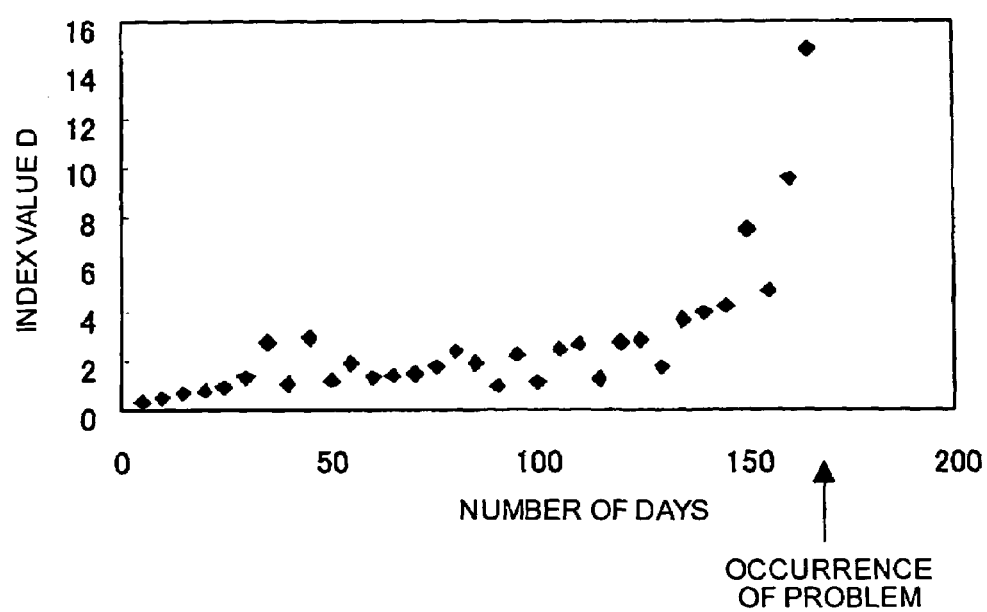
FIG. 18 is a graph of transition (temporal change) in an index value D calculated in a third example.

FIG. 18 is a graph of transition (temporal change) in an actual index value D calculated with respect to the printer of the third example. As in FIG. 18, an arrow indicates a timing at which a problem (abnormal state), more specifically, toner filming on the photosensitive body occurred. In this case, an index value D, representing failure prediction on which an installation environment and a using state of each printer are reflected, is obtained for the printer. Thus, highly accurate prediction can be performed. Before a problem (toner filming) actually occurs, the index value D tends to increase. On the basis of a temporal change in the index value D when the index value D increases, a change of the subsequent state of the printer is decided, a period of time taken until the index value D becomes a value at which the problem (toner filming) occurs can be understood. Thus, whether the problem (toner filming) will occur and the time at which the problem (toner filming) will occur can be predicted.

When the index value D indicates a value larger than a predetermined value, the control unit 5 shown in FIG. 1 performs necessary operation control of the image forming system or executes restoration modes. Operations to be controlled include restricting a number of continuous prints, or inhibiting a color output mode. Restoration modes include cleaning a photosensitive body or units around the photosensitive body, control of image concentration or colors (an image or a potential to be formed is detected, and the image or the potential is fed back to bias power supplies, a motor, or the like to obtain a predetermined value), charging a toner (a developing device is operated to charge the toner), and the like. In addition, an spare parts such as a charging member, a cleaning member, and the like arranged in the apparatus may be automatically replaced.

In a fourth example, the system described in the first example is designated to execute an information item deriving mode that calculates an information item closely correlated to a specifically occurring problem. More specifically, the information item deriving mode is executed as follows.

(1) In an initial state (N0), an intermediate state (N1), or a state immediately before occurrence of a problem (Nt), compare the data of all the information items of k types with each other.

(2) Detect whether the state immediately before occurrence of the problem (Nt) includes an item representing an item extremely different from the values in the initial state (N0) and the intermediate state (N1). For example, the absolute value of the difference between N0 and N1 is compared with the absolute value of the difference between N0 and Nt. If the latter is five or more times the former, the item is valid.

(3) If such an item is present, the item is stored in the storage device, displayed on the display device, or transmitted to the monitoring system through a communication network.

Using the data shown in FIG. 17, data on the fifth day was set in the initial state (N0), data on the fifteenth day was set in the intermediate state (N1), and data on 165th day was set in the state immediately before occurrence of the problem (Nt). The numerical values in the respective information items are compared with each other. As a result, the information items having a large difference between the numerical values are three items described in Table 6.

TABLE 6

| Item | Initial state (N0) | Intermediate state (N1) | Problem occurrence state (Nt) | Occurring problem |
|---|---|---|---|---|
| Ratio of colored area | 2.0 | 2.2 | 10.0 | Photosensitive body filming |
| Vibration | 5 | 5.5 | 15.0 | |
| Toner concentration | 6.5 | 5 | 12.0 | |

These items and the occurring problem are stored in relation to each other. The stored data are used in system development, so that a highly accurate abnormal state occurrence prediction system can be realized. In this case, although the initial state and the intermediate state are arbitrarily set, the system must be always operated. A plurality of intermediate states may be set.

According to the present invention, whether an abnormal state will occur, and a time at which the abnormal state might occur can be predicted.

Moreover, occurrence of the abnormal state can be predicted based on a temporal change of a single index value D. Therefore, data processing to predict occurrence of an abnormal state is easy.

Furthermore, the change of the state of the image forming apparatus can be accurately decided, and hence, an abnormal state can be predicted with high accuracy.

Moreover, maintenance of the image forming apparatus can be performed before the abnormal state actually occurs.

In the embodiment, a calculation method for calculating the index value D, i.e., a calculation expression for the index value D may be determined by the following procedures (1) to (5):

(1) Acquire n combinations of pieces of information of k types selected in advance as the pieces of information of different types while the image forming apparatus is operated;

(2) Standardize the (k×n) pieces of information acquired according to types using averages and standard deviations of the pieces of information;

(3) Calculate correlation coefficients of all the combinations of the (k×n) pieces of information standardized;

(4) Calculate an inverse matrix of a (k×k) matrix that includes all correlation coefficients as elements; and (5) Define the calculation method (calculation expression), using all the elements of the inverse matrix.

In this case, the (k×n) pieces of information acquired are standardized according to types using the averages and the standard deviations to reduce influence of the fluctuation of statistical data.

The values of the elements of the inverse matrix used in determining the calculation method (calculation expression) are large when the values are closely related to the state change of the image forming apparatus. Using the elements of the inverse matrix, the index value D can be calculated with a weight, which increases in proportion to the relativity between the state change and the correlation between the pieces of information of the different types. Therefore, the state change of the image forming apparatus can be decided with higher accuracy.

With such configuration, occurrence of an abnormal state in the image forming apparatus can be predicted with higher accuracy.

In the process of determining the calculation method (calculation expression) described in (1) to (5), the n combinations of pieces of information may be acquired from one image forming apparatus in a time-series manner. Pieces of information used in determining the index value calculation expression can be acquired by using a plurality of image forming apparatuses for one test. Thus, developing cost reduces.

Alternatively, the n combinations of pieces of information may be acquired in parallel from the plurality of image forming apparatuses. In this case, information acquisition for the determination of the calculation method (calculation expression) of the index value can be performed in parallel using the plurality of image forming apparatuses of the same type. Thus, development time reduces.

In the embodiment, different types of abnormal states in the image forming apparatus may be stored in an information storage unit such that temporal changes of pieces of information acquired in advance are associated with the contents of the abnormal states. When the index value D calculated by the index value calculation unit 3 is larger than a predetermined reference value, the contents of an abnormal state, which is expected to occur thereafter, may be specified based on the subsequent temporal changes of the pieces of information and the pieces of information stored in the image storage unit. In this case, since the contents of the abnormal state can be specified based on the temporal change of the pieces of information, prediction accuracy of occurrence of an abnormal state improves, and more appropriate maintenance can be performed before occurrence of the abnormal state.

The information storage unit may be a memory such as a RAM constituting the control unit 5. An abnormal state contents specifying unit that specifies the contents of the abnormal state may be a CPU or the like constituting the control unit 5. The information storage unit and the abnormal state contents specifying unit may be constituted by devices including single-purpose LSIs arranged independently of the control unit 5. Instead of the contents of the abnormal state, the contents of maintenance performed when the abnormal state occurs may be associated with the temporal changes of the pieces of information. The contents of the abnormal state and the contents of the maintenance performed when the abnormal state occurs may be associated with each other.

In this embodiment, a state decision apparatus including a communication unit may be arranged outside the image forming apparatus. The communication unit may receive the pieces of information used in calculation of the index value D from the image forming apparatus through a communication network such as a single-purpose network, a public network, the Internet, or a local area network. Thus, the image forming apparatus can be simplified. In addition, a decision of a state change or prediction of an abnormal state in the image forming apparatuses can be integrally performed by a monitoring center or the like, in which the state decision apparatus is installed.

In the image forming apparatus according to the embodiment, the control unit 5 may control the image forming system 6 on the basis of the temporal change in the index value D. In this case, the image forming system 6 can be rapidly controlled such that the state change of the image forming apparatus is decided to predict occurrence of an abnormal state. Thus, occurrence of a serious failure can be avoided.

According to the embodiment, the present invention is effectively applied to an image forming apparatus that uses an electronic photographing scheme including the following processes. A latent image is formed on an image carrier, the latent image on the image carrier is developed to form a toner image, and the toner image formed is transferred to a recording medium directly or through an intermediate transfer body. The image forming apparatus of the electronic photographing scheme has the following characteristic features. (1) The image forming apparatus includes a large number of constituent elements, and causal association of the development is complex. (2) The image forming apparatus is easily affected by ambient operating conditions such as temperature or humidity. (3) Consumable parts such as units and components easily deteriorate. (4) Ambient operating conditions largely change depending on users. Although the complex configuration and phenomenon described above intervenes in the image forming apparatus, occurrence of an abnormal state such as a failure the cause of which is not clear, can be predicted by simple data processing.

The image forming apparatus according to the embodiment may include an abnormal state prediction result display unit that displays a prediction result of occurrence of an abnormal state predicted. Thus, a user can know the occurrence of the abnormal state predicted from the information displayed. Consequently, maintenance can be performed prior to occurrence of the abnormal state.

The image forming apparatus according to the embodiment may include a communication unit that transmits a prediction result of occurrence of an abnormal state predicted to an external device through a communication network such as a single-purpose network, a public network, the Internet, or a local area network. In this case, prediction of occurrence of abnormal states in a plurality of image forming apparatuses can be integrally performed by a monitoring center or the like.

In the image forming apparatus according to the embodiment, the control unit 5 may control the image forming system 6 on the basis of a prediction result of occurrence of an abnormal state predicted, to restrict an image forming operation. In this case, a specific operation is temporarily restricted, depending on the prediction result, to avoid occurrence of a serious failure.

In the image forming apparatus according to the embodiment, the control unit 5 may execute a repair control mode to repair an abnormal state on the basis of the prediction result. Thus, it is possible to avoid occurrence of a serious failure.

In the image forming apparatus according to the embodiment, a calculation method for the index value D may be determined each time an operation of the image forming apparatus is started. Thus, even though correlation between pieces of information of different types acquired with respect to the image forming apparatus and relation between the correlation and occurrence of an abnormal state vary, a decision of a state change and prediction of occurrence of an abnormal state can be highly accurate.

According to the present invention, pieces of information of different types related to a state of an image forming apparatus are acquired, and an index value is calculated from the pieces of information acquired. The present inventors examined a relationship between a temporal change in the index value calculated and a state change occurring when the image forming apparatus is set in an abnormal state, by an experiment or the like. In this case, the temporal change in the index value calculated from the pieces of information corresponds to the state change of the image forming apparatus. In addition, it was understood that, if the index value was different from a value obtained in an initial normal state by a predetermined amount or more, an abnormal state such as a failure occurred in the image forming apparatus. Therefore, when the change of the subsequent state of the image forming apparatus is decided on the basis of the temporal change in the index value, a period of time taken until the index value becomes a value at which the abnormal state occurs, can be understood. Therefore, whether the abnormal state such as a failure will occur, and a time at which the abnormal state might occur can be predicted.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An abnormal state occurrence predicting method that predicts an occurrence of an abnormal state of an image forming apparatus, comprising:
    acquiring pieces of information of parameters of the image forming apparatus related to a state of the image forming apparatus;
    storing an original correlation value of the parameters in a stable state;
    calculating an index value by standardizing the pieces of information acquired based on an average and a standard deviation, the index value being an amount of change from the original correlation value; and
    deciding a change to the abnormal state of the image forming apparatus when the index value calculated exceeds a predetermined amount.

2. The abnormal state occurrence predicting method according to claim 1, wherein
    the pieces of information of the parameters of the image forming apparatus include at least one of a detection value detected by a sensor in the image forming apparatus, a control parameter used for controlling the image forming apparatus, and information related to an input image that is subjected to image formation.

3. The abnormal state occurrence predicting method according to claim 1, further comprising:
    determining a calculation method for calculating the index value, based on the pieces of information acquired during a normal operation of the image forming apparatus.

4. The abnormal state occurrence predicting method according to claim 3, wherein the determining includes
    (a) acquiring n combinations of k types of the pieces of information, selected in advance as the pieces of information of the parameters of the image forming apparatus, while the image forming apparatus is operated;
    (b) standardizing the (k×n) pieces of information acquired according to the types;
    (c) calculating correlation coefficients of all the combinations of the (k×n) pieces of information standardized;
    (d) calculating an inverse matrix of a (k×k) matrix that includes, as elements, all the correlation coefficients calculated; and
    (e) defining the calculation method using all the elements of the inverse matrix calculated.

5. A state deciding apparatus that decides a state of an image forming apparatus, comprising:
    an information acquiring unit that acquires pieces of information of parameters of the image forming apparatus related to the state of the image forming apparatus;
    an original correlation value calculating unit that stores an original correlation value of the parameters in a stable state;
    an index value calculating unit that calculates an index value by standardizing the pieces of information acquired based on an average and a standard deviation, the index value being an amount of change from the original correlation value; and a state change deciding unit that decides a change to an abnormal state of the image forming apparatus, based on a temporal change in when the index value calculated exceeds a predetermined amount.

6. The state deciding apparatus according to claim 5, further comprising:
an abnormal state occurrence prediction unit that predicts a time at which the abnormal state occurs in the image forming apparatus, based on a change in the index value calculated.

7. The state deciding apparatus according to claim 5, further comprising:
an index value display unit that displays the index value calculated.

8. The state deciding apparatus according to claim 5, wherein
the pieces of information of the parameters of the image forming apparatus include at least one of a detection value detected by a sensor in the image forming apparatus, a control parameter used for controlling the image forming apparatus, and information related to an input image that is subjected to image formation.

9. The state deciding apparatus according to claim 5, wherein
the index value calculating unit determines a calculation method for calculating the index value, based on the pieces of information acquired during a normal operation of the image forming apparatus.

10. The state deciding apparatus according to claim 9, wherein the index value calculating unit determines the calculation method by executing the following:
(a) acquiring n combinations of k types of the pieces of information, selected in advance as the pieces of information of the parameters of the image forming apparatus, while the image forming apparatus is operated;
(b) standardizing the (k×n) pieces of information acquired according to the types;
(c) calculating correlation coefficients of all the combinations of the (k×n) pieces of information standardized;
(d) calculating an inverse matrix of a (k×k) matrix that includes, as elements, all the correlation coefficients calculated; and
(e) defining the calculation method using all the elements of the inverse matrix calculated.

11. The state deciding apparatus according to claim 10, wherein
the information acquiring unit acquires the n combinations of the pieces of information, in a time-series manner, from one image forming apparatus.

12. The state deciding apparatus according to claim 10, wherein
the information acquiring unit acquires the n combinations of the pieces of information, in parallel, from a plurality of image forming apparatuses.

13. The state deciding apparatus according to claim 5, further comprising:
an information storing unit that stores temporal changes in the pieces of information acquired in advance with respect to different types of abnormal states of the image forming apparatus, in association with contents of the abnormal states; and
an abnormal state content specifying unit that specifies contents of the abnormal state that is likely to occur, if the index value calculated is larger than a predetermined reference value, based on subsequent temporal changes in the pieces of information and the temporal changes stored.

14. The state deciding apparatus according to claim 5, further comprising:
an information accepting unit that accepts a plurality of the pieces of information used in calculating the index value, from the image forming apparatus through a communication network.

15. An image forming system, comprising:
an image forming device that forms an image on a recording medium; and
a state change deciding device that decides a change in a state of the image forming device, wherein the state change deciding device is a state deciding apparatus including
an information acquiring unit that acquires pieces of information of parameters of the image forming apparatus related to the state of the image forming device,
an original correlation value calculating unit that stores an original correlation value of the parameters in a stable state,
an index value calculating unit that calculates an index value by standardizing the pieces of information acquired based on an average and a standard deviation, the index value being an amount of change from the original correlation value, and
a state change deciding unit that decides the change to an abnormal state of the image forming device when the index value calculated exceeds a predetermined amount.

16. The image forming system according to claim 15, further comprising:
a controlling device that controls the image forming device based on the index value calculated.

17. The image forming system according to claim 15, wherein
the image forming device forms a latent image on an image carrier, develops the latent image to form a toner image, and transfers the toner image to the recording medium in any one way chosen from a group consisting of transferring directly and transferring through an intermediate transferring body.

18. The image forming system according to claim 15, further comprising:
an abnormal state prediction display device that displays information about a predicted occurrence of the abnormal state based on the index value calculated.

19. The image forming system according to claim 18, further comprising:
a prediction transmitting device that transmits the information about the predicted occurrence of the abnormal state to an external device through a communication network.

20. The image forming system according to claim 16, wherein
the controlling device controls the image forming device to restrict an image forming operation based on the change in the state of the image forming device decided.

21. The image forming system according to claim 17, wherein
the controlling device controls the image forming device to restrict an image forming operation based on the change in the state of the image forming device decided.

22. The image forming system according to claim 16, wherein
the control device executes a repair control mode for repair based on the change in the state of the image forming device decided.

23. The image forming system according to claim 17, wherein
the control device executes a repair control mode for repair based on the change in the state of the image forming device decided.

24. The image forming system according to claim 15, wherein
the state change deciding device determines a calculation method for calculating the index value, each time an operation of the image forming device is started.

25. The image forming system according to claim 15, wherein
the index value calculating unit determines a calculation method for calculating the index value, based on the pieces of information acquired during a normal operation of the image forming apparatus, and
the index value calculating unit determines the calculation method by executing the following:
(a) acquiring n combinations of k types of the pieces of information, selected in advance as the pieces of information of the parameters of the image forming apparatus, while the image forming apparatus is operated;
(b) standardizing the (k×n) pieces of information acquired according to the types;
(c) calculating correlation coefficients of all the combinations of the (k×n) pieces of information standardized;
(d) calculating an inverse matrix of a (k×k) matrix that includes, as elements, all the correlation coefficients calculated; and
(e) defining the calculation method using all the elements of the inverse matrix calculated.

* * * * *